(12) United States Patent
Sowa et al.

(10) Patent No.: US 8,085,470 B2
(45) Date of Patent: *Dec. 27, 2011

(54) LINE HEAD AND AN IMAGE FORMING APPARATUS

(75) Inventors: Takeshi Sowa, Matsumoto (JP); Nozomu Inoue, Matsumoto (JP); Yujiro Nomura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 189 days.

This patent is subject to a terminal disclaimer.

(21) Appl. No.: 12/344,084

(22) Filed: Dec. 24, 2008

(65) Prior Publication Data

US 2009/0180193 A1 Jul. 16, 2009

(30) Foreign Application Priority Data

| Jan. 10, 2008 | (JP) | 2008-002984 |
| Oct. 29, 2008 | (JP) | 2008-278324 |

(51) Int. Cl.
*G02B 27/10* (2006.01)
(52) U.S. Cl. ........................ 359/626; 359/619
(58) Field of Classification Search .................. 359/619, 359/626
See application file for complete search history.

(56) References Cited

U.S. PATENT DOCUMENTS

| 5,345,336 | A | 9/1994 | Aoyama et al. |
| 6,069,741 | A | 5/2000 | Osawa |
| 6,653,705 | B2 | 11/2003 | Ushijima et al. |
| 6,816,181 | B2 | 11/2004 | Ohkubo |
| 6,844,888 | B2 | 1/2005 | Nakamura |
| 2006/0012670 | A1* | 1/2006 | Tsujino et al. ............... 347/251 |
| 2008/0080057 | A1 | 4/2008 | Yamamura |
| 2009/0244713 | A1 | 10/2009 | Kodera et al. |

FOREIGN PATENT DOCUMENTS

| JP | 2801838 | 9/1998 |
| JP | 2005-276849 | 10/2005 |
| JP | 2008-152039 | 7/2008 |

* cited by examiner

*Primary Examiner* — James Greece
(74) *Attorney, Agent, or Firm* — DLA Piper LLP (US)

(57) ABSTRACT

A line head, includes: a lens array that includes a first lens, a second lens and a light transmissive substrate on which the first lens and the second lens are arranged in a first direction; and a light emitting element substrate on which light emitting elements are arranged in the first direction, wherein the first lens is formed such that, in a cross section in the first direction including an optical axis of an imaging optical system comprised of the first lens, a curvature of the first lens at an outer peripheral portion has a sign opposite to that of a curvature of the first lens on the optical axis or has a smaller absolute value than the curvature of the first lens on the optical axis.

9 Claims, 32 Drawing Sheets

F I G. 1 7
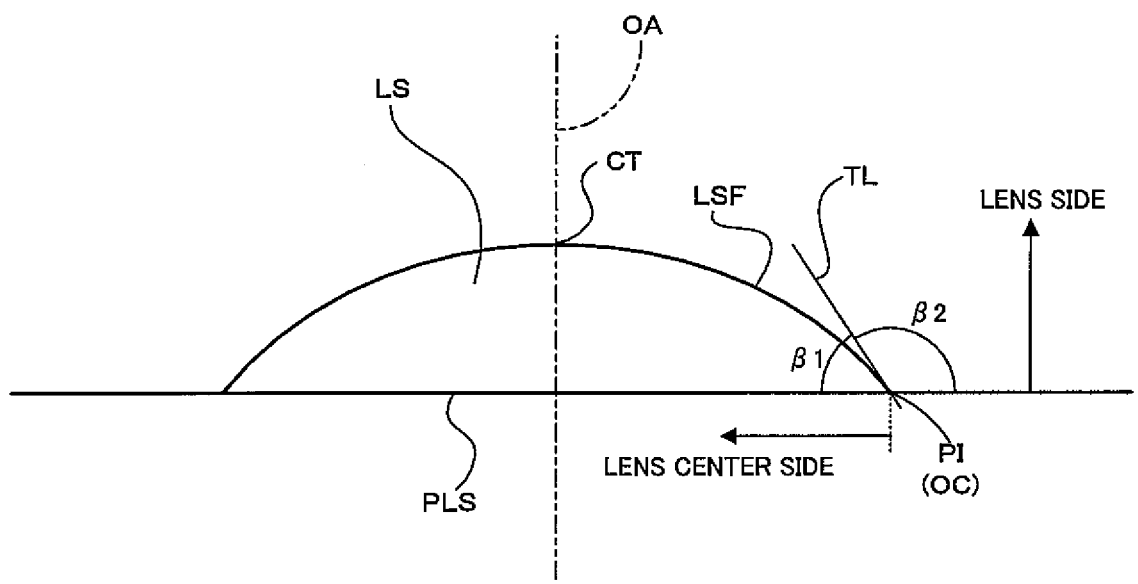
ANGLE OF TANGENT AT OUTER PERIPHERAL
PORTION: $\beta 1$
INCLINATION OF TANGENT AT OUTER
PERIPHERAL PORTION: $\tan(\beta 1)$
$0° < \beta 1 < 90°$ FIG. 19A: CROSS SECTION IN LONGITUDINAL DIRECTION INCLUDING OPTICAL AXES
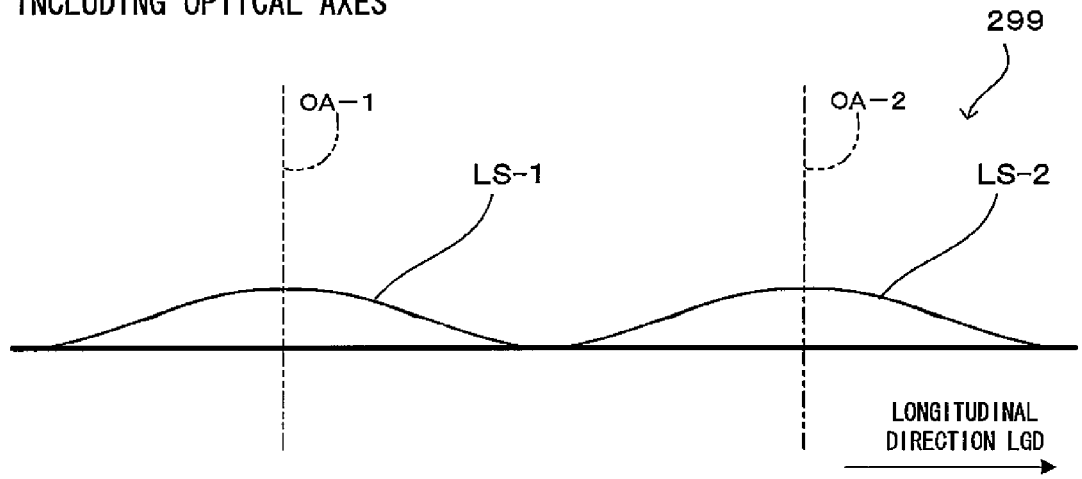
FIG. 19B: CROSS SECTION IN WIDTH DIRECTION INCLUDING OPTICAL AXIS OF LENS LS-1 (SECOND CROSS SECTION)
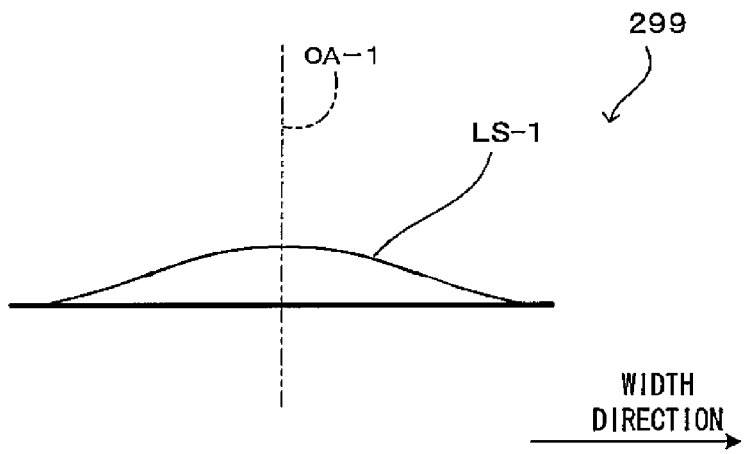
FIG. 19C: CROSS SECTION IN WIDTH DIRECTION INCLUDING OPTICAL AXIS OF LENS LS-3 (THIRD CROSS SECTION)
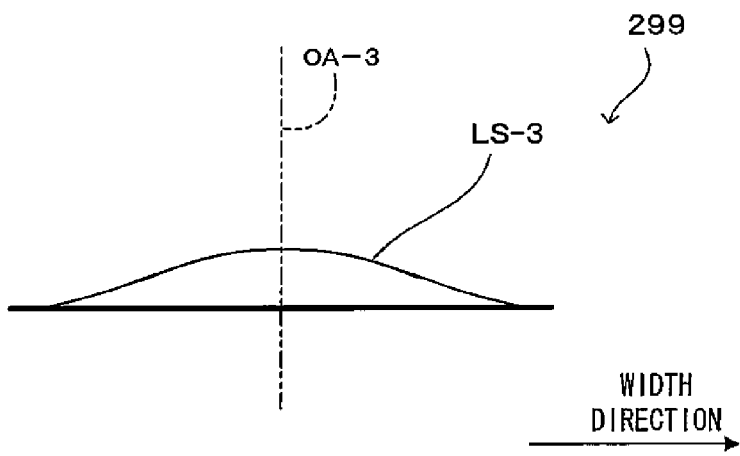

FIG. 22

UNIT: mm

| SURFACE NUMBER | r (CURVATURE RADIUS) | d | nd | vd | K,A,B,C (ASPHERIC DATA) |
|---|---|---|---|---|---|
| S1 (OBJECT PLANE) | r1=∞ | d1=1.0794 | | | |
| S2 | r2=∞ | d2=0.5000 | nd2=1.5168 | vd2=64.2 | |
| S3 (ASPHERIC SURFACE) | r3=−0.600 | d3=0.2591 | | | K3=0.0<br>A3=0.0<br>B3=0.0<br>C3=50.0 |
| S4 (APERTURE) | r4=∞ | d4=1.0431 | | | |
| S5 | r5=∞ | d5=0.5000 | nd5=1.5168 | vd5=64.2 | |
| S6 (ASPHERIC SURFACE) | r6=−0.708 | d6=1.0000 | | | K3=0.0<br>A3=0.0<br>B3=0.0<br>C3=50.0 |
| S7 (IMAGE PLANE) | r7=∞ | | | | |

DEFINITIONAL EQUATION OF ASPHERIC SURFACE…

$$\frac{cr^2}{1+\sqrt{1-(1+K)c^2r^2}} + Ar^4 + Br^6 + Cr^8$$

r: DISTANCE FROM OPTICAL AXIS
c: CURVATURE ON OPTICAL AXIS
K: CONIC CONSTANT
A,B,C: ASPHERIC CONSTANT

CROSS SECTION IN MAIN SCANNING DIRECTION

CROSS SECTION IN SUB SCANNING DIRECTION

FIG. 25

SIMULATION CONDITION

| WAVE LENGTH | 632.5[nm] |
|---|---|
| NUMERICAL APERTURE ON IMAGE SIDE | 0.13917 |
| MAIN-SCANNING SPOT GROUP WIDTH Wsgm | 0.180[mm] |
| SUB-SCANNING SPOT GROUP WIDTH Wsgs | 0.042[mm] |
| MAGNIFICATION | −1.0 |

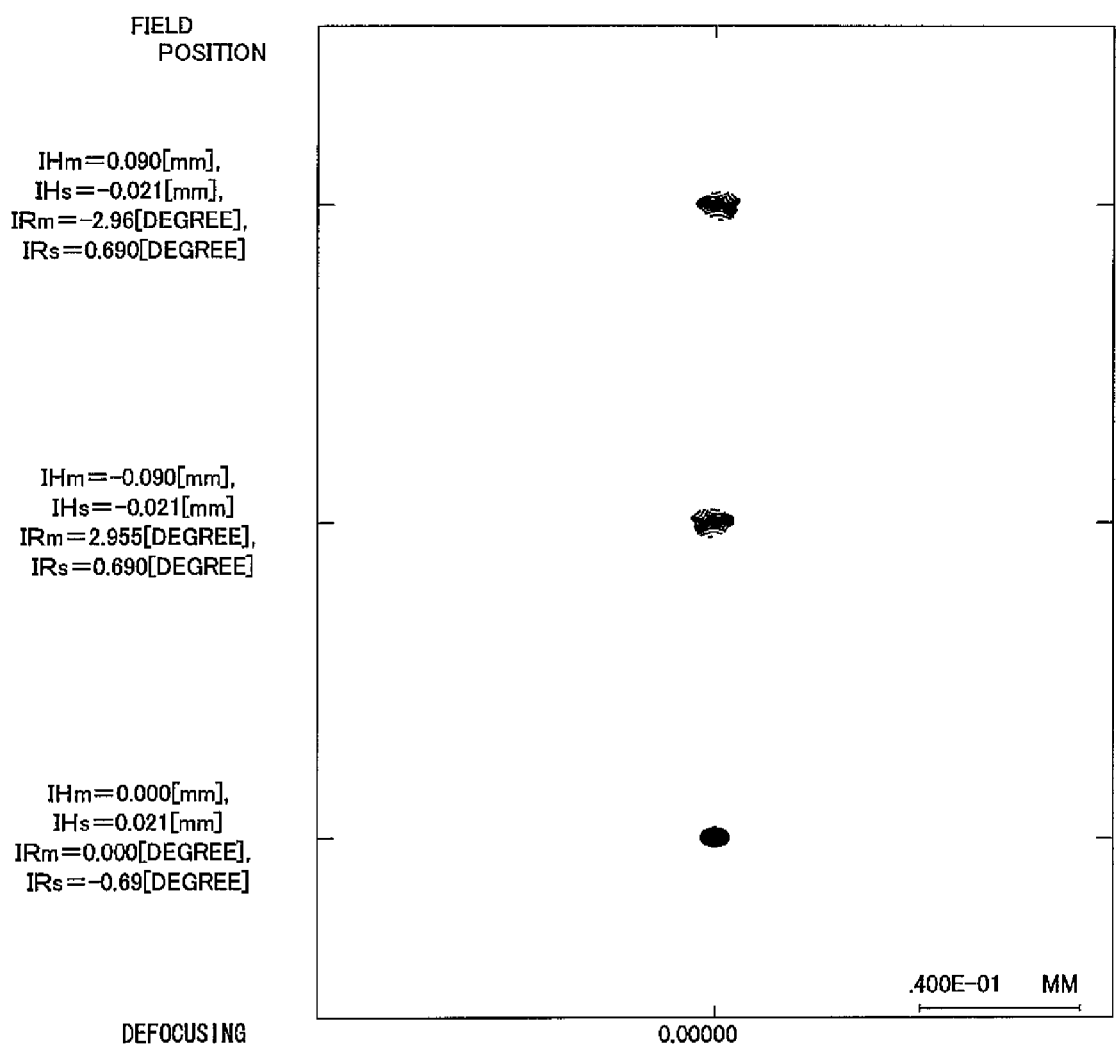

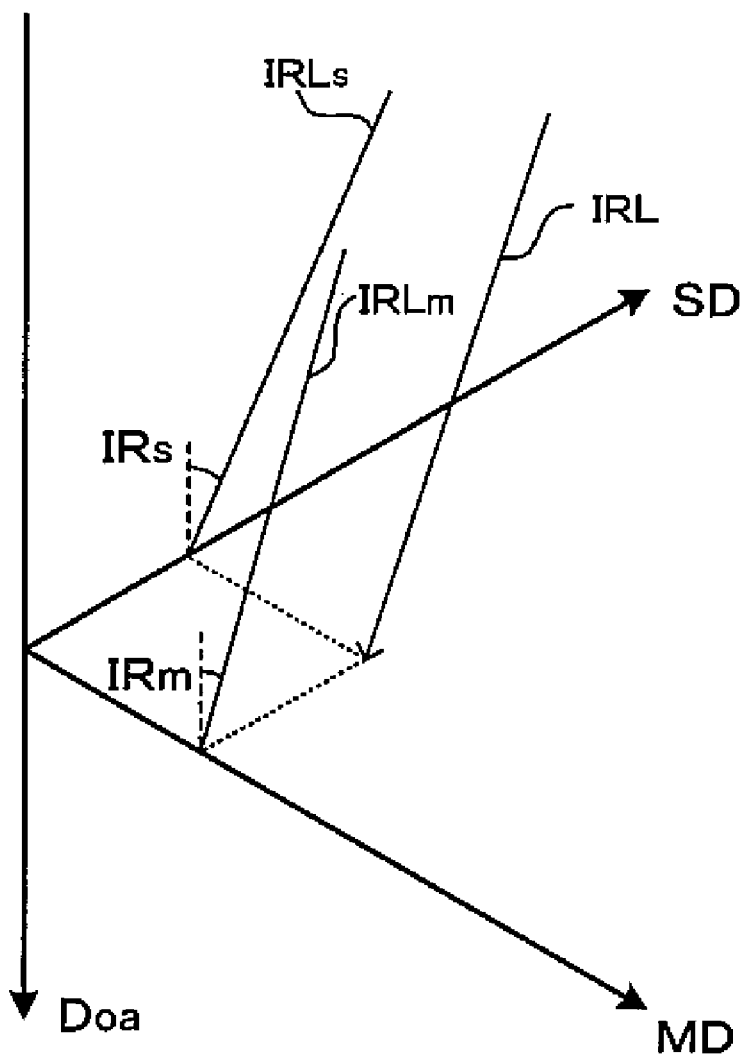

FIG. 28

LENS DATA OF FIRST LENS LS1

| | |
|---|---|
| CURVATURE ON OPTICAL AXIS | 1.67 |
| LENS DIAMETER | 0.54[mm] |
| SAG OF LENS | 0.063[mm] |
| CURVATURE AT LENS OUTER PERIPHERAL PORTION | 0.94 |
| INCLINATION OF TANGENT AT LENS OUTER PERIPHERAL PORTION | 0.462 |

FIG. 29

LENS DATA OF SECOND LENS LS2

| | |
|---|---|
| CURVATURE ON OPTICAL AXIS | 1.41 |
| LENS DIAMETER | 0.54[mm] |
| SAG OF LENS | 0.052[mm] |
| CURVATURE AT LENS OUTER PERIPHERAL PORTION | 0.58 |
| INCLINATION OF TANGENT AT LENS OUTER PERIPHERAL PORTION | 0.370 |

FIG. 30

UNIT: mm

| SURFACE NUMBER | r (CURVATURE RADIUS) | d | nd | K,A,B,C,D,E,F,G,H,I (ASPHERIC DATA) |
|---|---|---|---|---|
| S1 (OBJECT PLANE) | r1= ∞ | d1= 0.55 | nd1= 1.499857 | |
| S2 (EMERGENT SURFACE OF GLASS BASE MATERIAL) | r2= ∞ | d2= 3.7977 | | |
| S3 (APERTURE) | r3= ∞ | d3= 0.02 | | |
| S4 (ASPHERIC SURFACE) | r4= 1.457107 | d4= 0.31 | nd4= 1.525643 | K4=-0.925380<br>A4=0.003778919<br>B4=-0.07593031<br>C4=0.2176806<br>D4=-0.1990958 |
| S5 (GLASS BASE MATERIAL) | r5= ∞ | d5= 0.87 | nd5= 1.536988 | |
| S6 | r6= ∞ | d6= 1.3804 | | |
| S7 (x-y POLYNOMIAL SURFACE) | r7= 1.125063 | d7= 0.38 | nd7= 1.525643 | K7=-0.8112006<br>A7=0.0<br>B7=-0.00607781<br>C7=-0.01109546<br>D7=-0.03865398<br>E7=0.02335739<br>F7=-0.02745601<br>G7=-0.08607795<br>H7=-0.0902554<br>I7=-0.1544560 |
| S8 (GLASS BASE MATERIAL) | r8= ∞ | d8= 0.82 | nd8= 1.536988 | |
| S9 | r9= ∞ | d9= 0.8 | | |
| S10 (IMAGE PLANE) | r10= ∞ | | | |

$r^2 = x^2 + y^2$

DEFINITIONAL EQUATION OF ASPHERIC SURFACE⋯ $\dfrac{cr^2}{1+\sqrt{1-(1+K)c^2r^2}} + Ar^4 + Br^6 + Cr^8 + Dr^{10}$ NON-ROTATIONALLY-SYMMETRICAL ASPHERIC SURFACE (x-y POLYNOMIAL SURFACE) DEFINITIONAL EQUATION⋯

$\dfrac{cr^2}{1+\sqrt{1-(1+K)c^2r^2}} + Ax^2 + By^2 + Cx^4 + Dx^2y^2 + Ey^4 + Fx^6 + Gx^4y^2 + Hx^2y^4 + Iy^6$ x⋯MAIN SCANNING DIRECTION COORDINATE
y⋯SUB SCANNING DIRECTION COORDINATE
c⋯CURVATURE ON OPTICAL AXIS
K⋯CONIC CONSTANT
A,B,C,D,E,F,G,H,I⋯ASPHERIC COEFFICIENT

FIG. 33

SIMULATION CONDITION

| WAVE LENGTH | 690[nm] |
|---|---|
| NUMERICAL APERTURE ON IMAGE SIDE | 0.3000 |
| MAIN-SCANNING SPOT GROUP WIDTH Wsgm | 0.65[mm] |
| SUB-SCANNING SPOT GROUP WIDTH Wsgs | 0.0635[mm] |
| MAGNIFICATION | −0.5 |

FIG. 34

LENS DATA OF SECOND LENS LS2 IN MAIN SCANNING DIRECTION

| CURVATURE ON OPTICAL AXIS | 0.889 |
|---|---|
| LENS DIAMETER (MAIN SCANNING DIRECTION) | 1.60[mm] |
| SAG OF LENS | 0.28[mm] |
| CURVATURE AT LENS OUTER PERIPHERAL PORTION | 0.354 |
| INCLINATION OF TANGENT AT LENS OUTER PERIPHERAL PORTION | 0.668 |
| THICKNESS OF RESIN AT NON-LENS PART | 0.1[mm] |
| DISTANCE BETWEEN ADJACENT LENSES | 0.18[mm] |

FIG. 35

LENS DATA OF SECOND LENS LS2 IN SUB SCANNING DIRECTION

| CURVATURE ON OPTICAL AXIS | 0.877 |
|---|---|
| LENS DIAMETER (SUB SCANNING DIRECTION) | 1.70[mm] |
| SAG OF LENS | 0.28[mm] |
| CURVATURE AT LENS OUTER PERIPHERAL PORTION | −0.866 |
| INCLINATION OF TANGENT AT LENS OUTER PERIPHERAL PORTION | 0.440 |

FIG. 36

LENS DATA OF FIRST LENS LS1

| CURVATURE ON OPTICAL AXIS | 0.686 |
|---|---|
| LENS DIAMETER (MAIN SCANNING DIRECTION) | 1.60[mm] |
| SAG OF LENS | 0.22[mm] |
| CURVATURE AT LENS OUTER PERIPHERAL PORTION | 0.003 |
| INCLINATION OF TANGENT AT LENS OUTER PERIPHERAL PORTION | 0.512 |
| THICKNESS OF RESIN AT NON-LENS PART | 0.09[mm] |
| DISTANCE BETWEEN ADJACENT LENSES | 0.18[mm] |

LINE HEAD AND AN IMAGE FORMING APPARATUS

CROSS REFERENCE TO RELATED APPLICATION

The disclosure of Japanese Patent Applications No. 2008-002984 filed on Jan. 10, 2008 and No. 2008-278324 filed on Oct. 29, 2008 including specification, drawings and claims is incorporated herein by reference in its entirety.

BACKGROUND

1. Technical Field

This invention relates to a line head including a lens array in which first and second lenses are arranged in a first direction of a light transmissive substrate and an image forming apparatus using this line head.

2. Related Art

As such a line head, a line head in which each lens is provided for a plurality of light emitting elements and lights from the light emitting elements are imaged by the lenses to expose an image plane such as a latent image carrier surface is known. For example, in a line head disclosed in Japanese Patent No. 2801838, a plurality of light emitting element groups (corresponding to a plurality of light emitting diodes provided on a light emitting diode element array in Japanese Patent No. 2801838) formed by grouping a plurality of light emitting elements are aligned in a longitudinal direction. One lens is provided for each light emitting element group in the lens array and the light emitting element groups emit light beams toward the lenses.

SUMMARY

For a purpose of a higher-resolution exposing operation or the like, it is possible to use a line head in which a light emitting element group row is formed by aligning a plurality of light emitting element groups in a longitudinal direction (first direction) and a plurality of light emitting element group rows are arranged in a width direction (second direction). In other words, in this line head, the light emitting element groups are two-dimensionally arranged. Corresponding to such an arrangement of the light emitting element groups, lenses are also two-dimensionally arranged in a lens array, with the result that the lens array has a two-dimensional convexo-concave shape.

However, upon fabricating the lens array having such a two-dimensional convexo-concave shape, there have been cases where the following problem occurs. Specifically, the lens array can be fabricated using a so-called mold formed with recesses in conformity with the lens shape. More specifically, for example in JP-A-2005-276849, the recesses are filled with a light curing resin with a glass substrate and a mold (mold 112 in JP-A-2005-276849) held in contact, and the light curing resin is solidified by light irradiation, whereby lenses are formed on the glass substrate. When the light curing resin is solidified, the mold is released from the lens and the glass substrate (mold releasing). By way of such a process, the lens array with a plurality of lenses is formed. In a technique like this, when the lens array has a two-dimensional convexo-concave shape, there have been cases where the lens array cannot be properly released from the mold upon releasing the mold and the mold releasability of the lens array deteriorates.

An advantage of some aspects of the invention is to provide technology enabling an improvement in the mold releasability of a lens array formed with a plurality of lenses on a surface of a light transmissive substrate.

According to a first aspect of the invention, there is provided a line head, comprising: a lens array that includes a first lens, a second lens and a light transmissive substrate on which the first lens and the second lens are arranged in a first direction; and a light emitting element substrate on which light emitting elements are arranged in the first direction, wherein the first lens is formed such that, in a cross section in the first direction including an optical axis of an imaging optical system comprised of the first lens, a curvature of the first lens at an outer peripheral portion has a sign opposite to that of a curvature of the first lens on the optical axis or has a smaller absolute value than the curvature of the first lens on the optical axis.

According to a second aspect of the invention, there is provided an image forming apparatus, comprising: an exposure device that includes a lens array which has a first lens, a second lens and a light transmissive substrate on which the first lens and the second lens are arranged in a first direction, and a light emitting element substrate on which light emitting elements are arranged in the first direction; a latent image carrier on which a latent image is formed by the exposure device; and a developer that develops the latent image formed on the latent image carrier, wherein the first lens is formed such that, in a cross section in the first direction including an optical axis of an imaging optical system comprised of the first lens, a curvature of the first lens at an outer peripheral portion has a sign opposite to that of a curvature of the first lens on the optical axis or has a smaller absolute value than the curvature of the first lens on the optical axis.

In the invention thus constructed, the lens array includes a first lens and a second lens. These lenses are arranged in a first direction on a surface of a light transmissive substrate. A surface of the first lens is formed as follows. Specifically, in a cross section in the first direction including an optical axis of an imaging optical system comprised of the first lens, a curvature of the first lens at an outer peripheral portion has a sign opposite to that of a curvature of the first lens on the optical axis or has a smaller absolute value than the curvature of the first lens on the optical axis. Thus, an angle of tangent at the outer peripheral portion of the first lens is suppressed to a small value and the first lens is so shaped as to be easily released from a mold. As a result, the mold releasability of the lens array can be improved.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIG. 14 is a diagram showing the relation of the spot groups, the lens diameter and the like.

FIG. 17 is a diagram defining the angle of tangent at the lens outer peripheral portion and showing a cross section including the optical axis.

FIGS. 19A, 19B and 19C are diagrams showing lens surfaces in specific cross sections.

FIG. 22 is a table showing data on an optical system according to Example 1.

FIG. 25 is a table showing conditions used upon calculating optical paths shown in FIGS. 23 and 24 by a simulation.

FIG. 26 is a chart showing spot diagrams in Example 1.

FIG. 27 is a diagram showing the incident angles.

FIG. 28 is a table showing the lens data of a first lens in Example 1.

FIG. 29 is a table showing the lens data of a second lens in Example 1.

FIG. 30 is a table showing data on an optical system according to Example 2.

FIG. 33 is a table showing conditions used upon calculating optical paths shown in FIGS. 31 and 32 by a simulation.

FIG. 34 is a table showing the lens data of a second lens in Example 2.

FIG. 35 is a table showing the lens data of the second lens in the sub scanning direction in Example 2.

FIG. 36 is a table showing the lens data of a first lens in Example 2.

DESCRIPTION OF EXEMPLARY EMBODIMENTS

Terms used in this specification are first described below (see "A. Description of Terms"). Following this description of terms, a basic construction of an image forming apparatus including a line head as an application subject of the invention (see "B. Basic Construction") and a basic operation of the line head (see "C. Basic Operation") are described. Following the description of the basic construction and the basic operation, a construction required for a lens array of the line head according to an embodiment (see "D. Construction Required for Lens Array") is described and a construction of the lens array according to the embodiment of the invention (see "E. Construction of Lens Array in the Embodiment") is described.

A. Description of Terms

Figure 1:
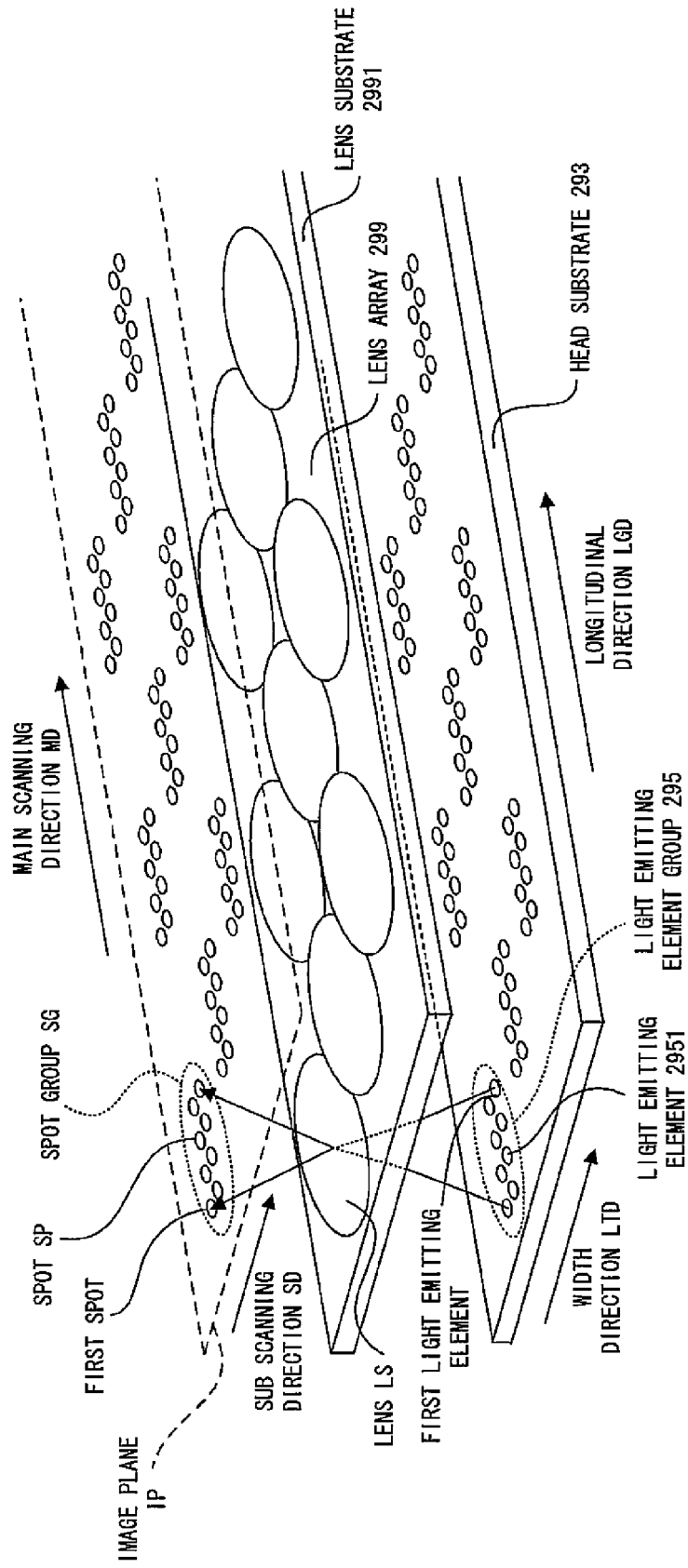
FIGS. 1 and 2 are diagrams showing terminology used in this specification.
Figure 2:
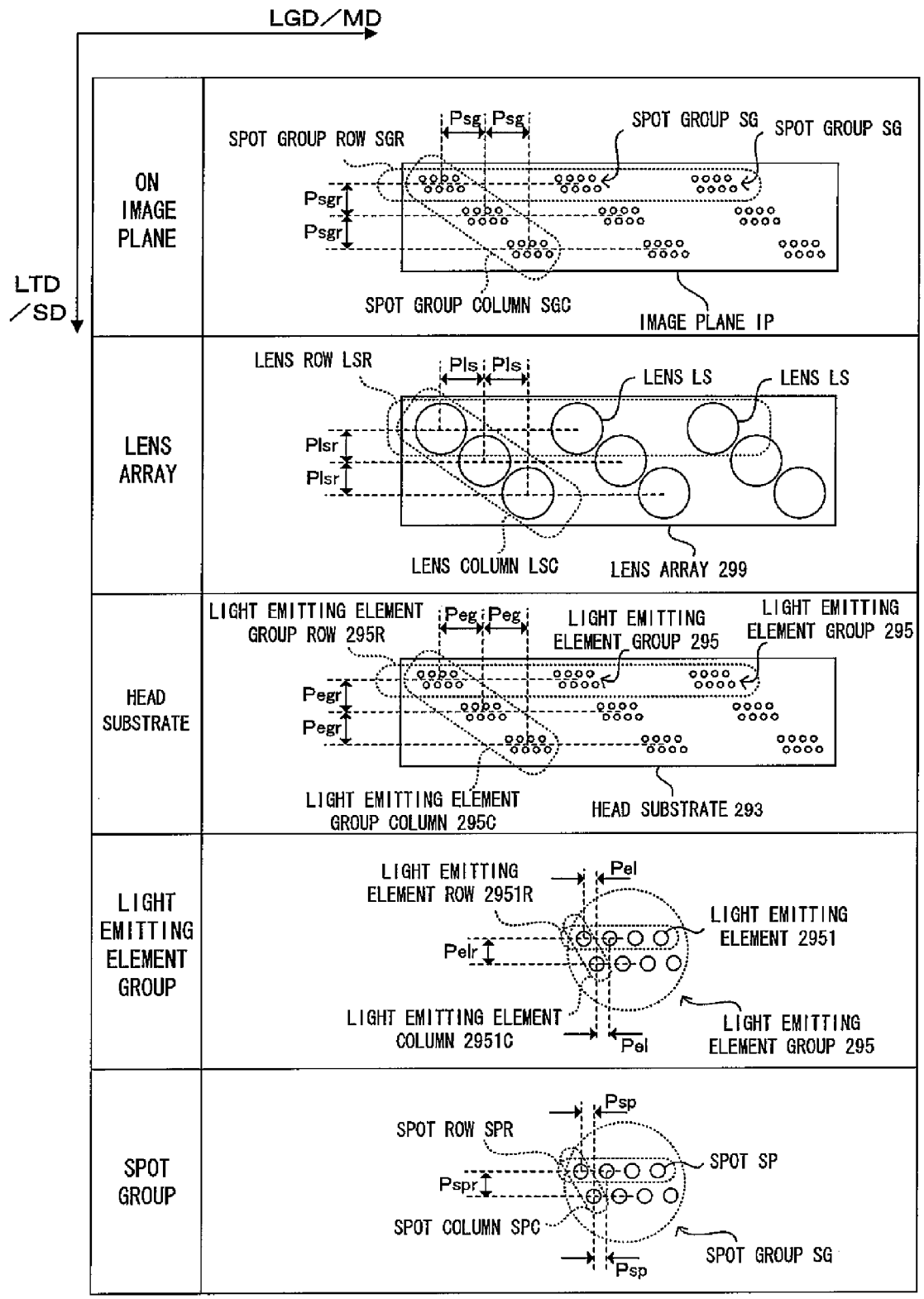

FIGS. 1 and 2 are diagrams showing terminology used in this specification. Here, terminology used in this specification is organized with reference to FIGS. 1 and 2. In this specification, a conveying direction of a surface (image plane IP) of a photosensitive drum 21 is defined to be a sub scanning direction SD and a direction orthogonal to or substantially orthogonal to the sub scanning direction SD is defined to be a main scanning direction MD. Further, a line head 29 is arranged relative to the surface (image plane IP) of the photosensitive drum 21 such that its longitudinal direction LGD corresponds to the main scanning direction MD and its width direction LTD corresponds to the sub scanning direction SD.

Collections of a plurality of (eight in FIGS. 1 and 2) light emitting elements 2951 arranged on the head substrate 293 in one-to-one correspondence with the plurality of lenses LS of the lens array 299 are defined to be light emitting element groups 295. In other words, in the head substrate 293, the plurality of light emitting element groups 295 including a plurality of light emitting elements 2951 are arranged in conformity with the plurality of lenses LS, respectively. Further, collections of a plurality of spots SP formed on the image plane IP by light beams from the light emitting element groups 295 imaged on the image plane IP by the lenses LS corresponding to the light emitting element groups 295 are defined to be spot groups SG. In other words, a plurality of spot groups SG can be formed in one-to-one correspondence with the plurality of light emitting element groups 295. In each spot group SG, the most upstream spot in the main scanning direction MD and the sub scanning direction SD is particularly defined to be a first spot. The light emitting element 2951 corresponding to the first spot is particularly defined to be a first light emitting element.

A spot group row SGR and a spot group column SGC are defined as shown in the column "On Image Plane" of FIG. 2. Specifically, a plurality of spot groups SG arranged in the main scanning direction MD are defined as the spot group row SGR. A plurality of spot group rows SGR are arranged at specified spot group row pitches Psgr in the sub scanning direction SD. Further, a plurality of (three in FIG. 2) spot groups SG arranged at spot group row pitches Psgr in the sub scanning direction SD and at spot group pitches Psg in the main scanning direction MD are defined as the spot group column SGC. The spot group row pitch Psgr is a distance in the sub scanning direction SD between the geometric centers of gravity of two spot group rows SGR adjacent in the sub scanning direction SD, and the spot group pitch Psg is a distance in the main scanning direction MD between the geometric centers of gravity of two spot groups SG adjacent in the main scanning direction MD.

Lens rows LSR and lens columns LSC are defined as shown in the column of "Lens Array" of FIG. 2. Specifically, a plurality of lenses LS aligned in the longitudinal direction LGD is defined to be the lens row LSR. A plurality of lens rows LSR are arranged at specified lens row pitches Plsr in the width direction LTD. Further, a plurality of (three in FIG. 2) lenses LS arranged at the lens row pitches Plsr in the width direction LTD and at lens pitches Pls in the longitudinal direction LGD are defined to be the lens column LSC. It should be noted that the lens row pitch Plsr is a distance in the width direction LTD between the geometric centers of gravity of two lens rows LSR adjacent in the width direction LTD, and that the lens pitch Pls is a distance in the longitudinal direction LGD between the geometric centers of gravity of two lenses LS adjacent in the longitudinal direction LGD.

Light emitting element group rows 295R and light emitting element group columns 295C are defined as in the column "Head Substrate" of FIG. 2. Specifically, a plurality of light emitting element groups 295 aligned in the longitudinal direction LGD is defined to be the light emitting element group row 295R. A plurality of light emitting element group rows 295R are arranged at specified light emitting element group row pitches Pegr in the width direction LTD. Further, a plurality of (three in FIG. 2) light emitting element groups 295 arranged at the light emitting element group row pitches Pegr in the width direction LTD and at light emitting element group pitches Peg in the longitudinal direction LGD are defined to be the light emitting element group column 295C. It should be noted that the light emitting element group row pitch Pegr is a distance in the width direction LTD between the geometric centers of gravity of two light emitting element group rows 295R adjacent in the width direction LTD, and that the light emitting element group pitch Peg is a distance in the longitudinal direction LGD between the geometric centers of gravity of two light emitting element groups 295 adjacent in the longitudinal direction LGD.

Light emitting element rows 2951R and light emitting element columns 2951C are defined as in the column "Light Emitting Element Group" of FIG. 2. Specifically, in each light emitting element group 295, a plurality of light emitting elements 2951 aligned in the longitudinal direction LGD is defined to be the light emitting element row 2951R. A plurality of light emitting element rows 2951R are arranged at specified light emitting element row pitches Pelr in the width direction LTD. Further, a plurality of (two in FIG. 2) light emitting elements 2951 arranged at the light emitting element row pitches Pelr in the width direction LTD and at light emitting element pitches Pel in the longitudinal direction LGD are defined to be the light emitting element column 2951C. It should be noted that the light emitting element row pitch Pelr is a distance in the width direction LTD between the geometric centers of gravity of two light emitting element rows 2951R adjacent in the width direction LTD, and that the light emitting element pitch Pel is a distance in the longitudinal direction LGD between the geometric centers of gravity of two light emitting elements 2951 adjacent in the longitudinal direction LGD.

Spot rows SPR and spot columns SPC are defined as shown in the column "Spot Group" of FIG. 2. Specifically, in each spot group SG, a plurality of spots SP aligned in the longitudinal direction LGD is defined to be the spot row SPR. A plurality of spot rows SPR are arranged at specified spot row pitches Pspr in the width direction LTD. Further, a plurality of (two in FIG. 2) spots arranged at the spot row pitches Pspr in the width direction LTD and at spot pitches Psp in the longitudinal direction LGD are defined to be the spot column SPC. It should be noted that the spot row pitch Pspr is a distance in the sub scanning direction SD between the geometric centers of gravity of two spot rows SPR adjacent in the sub scanning direction SD, and that the spot pitch Psp is a distance in the main scanning direction MD between the geometric centers of gravity of two spots SP adjacent in the main scanning direction MD.

B. Basic Construction

Figure 3:
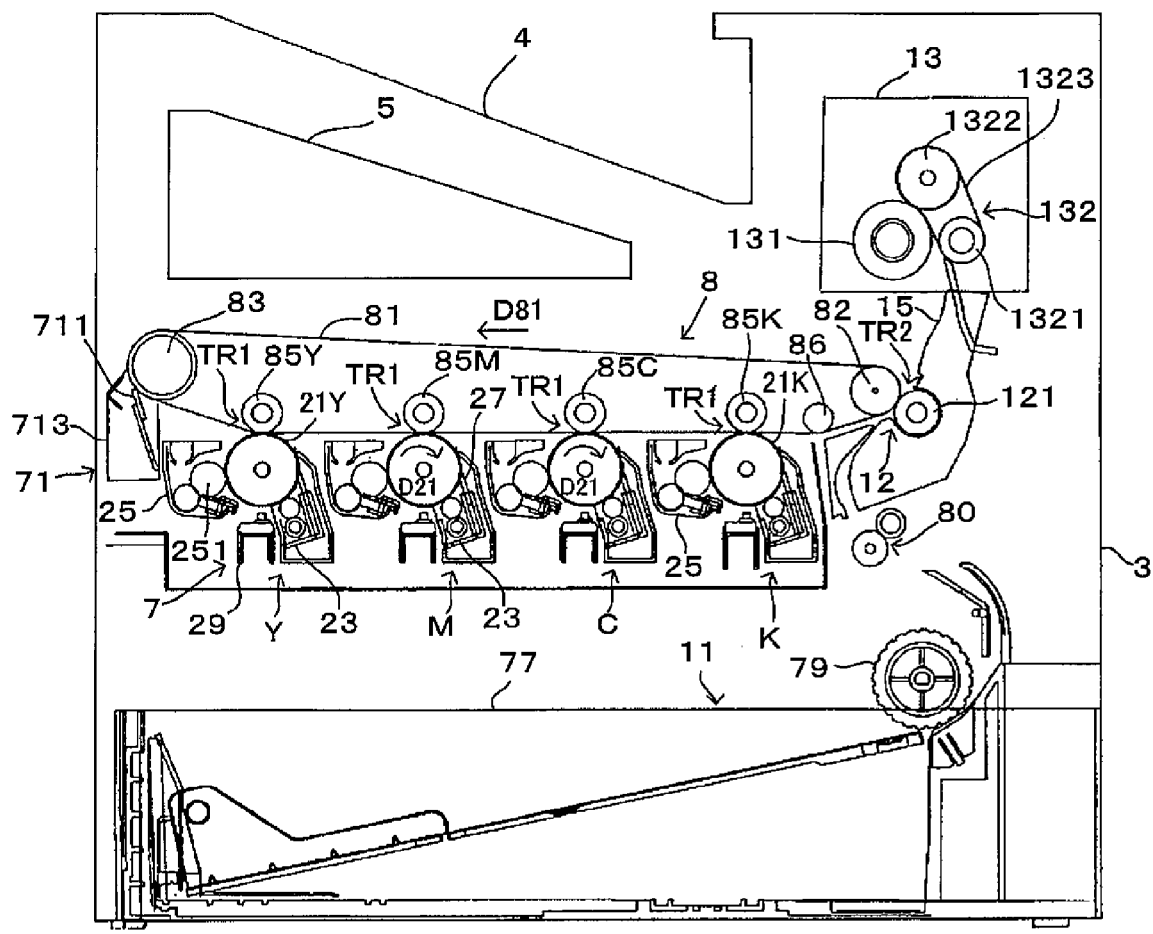
FIG. 3 is a diagram showing an embodiment of an image forming apparatus including a line head as an application subject of the invention.
Figure 4:
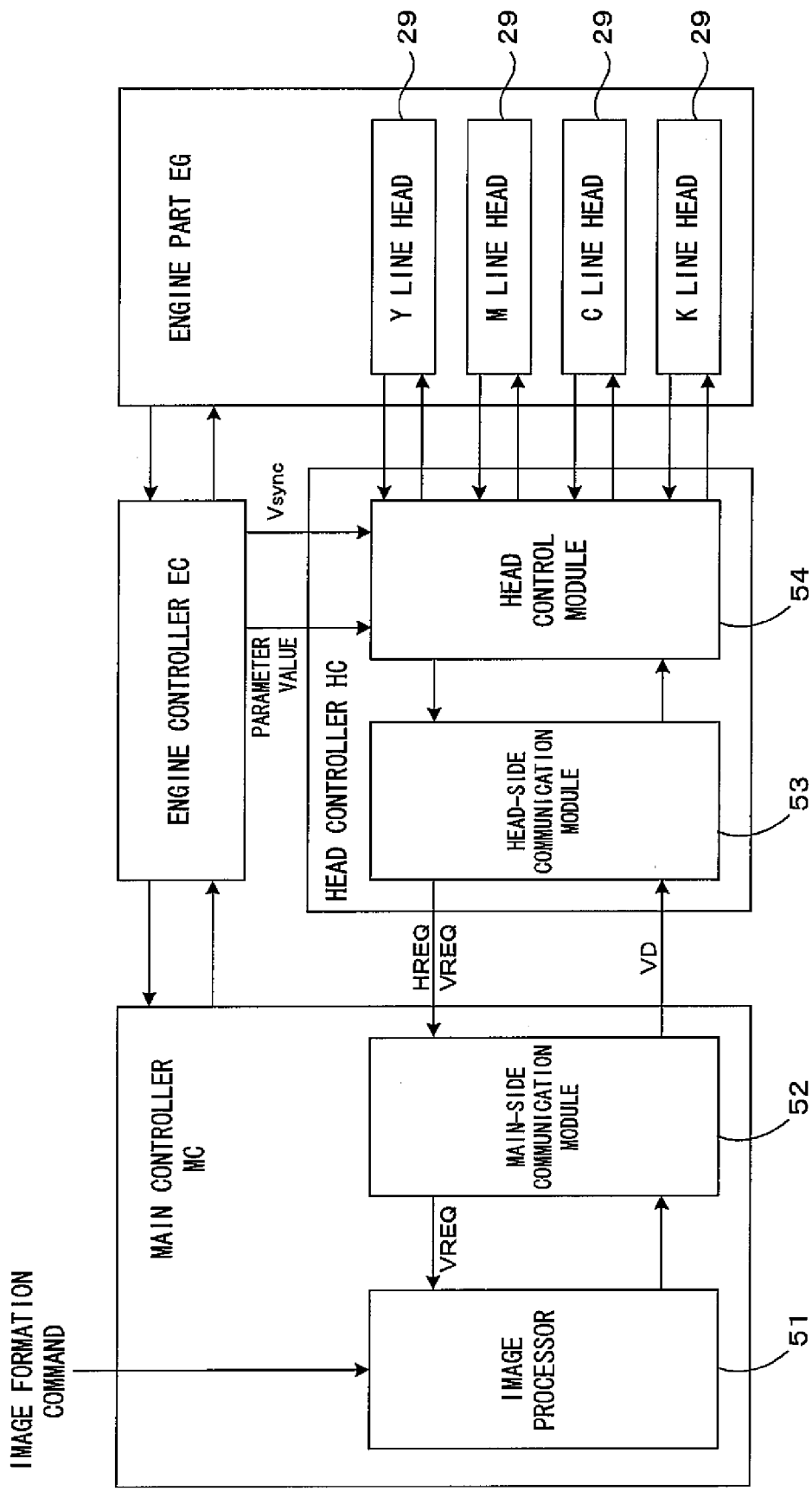
FIG. 4 is a diagram showing the electrical construction of the image forming apparatus of FIG. 3.

FIG. 3 is a diagram showing an embodiment of an image forming apparatus including a line head as an application subject of the invention. FIG. 4 is a diagram showing the electrical construction of the image forming apparatus of FIG. 3. This apparatus is an image forming apparatus that can selectively execute a color mode for forming a color image by superimposing four color toners of black (K), cyan (C), magenta (M) and yellow (Y) and a monochromatic mode for forming a monochromatic image using only black (K) toner. FIG. 3 is a diagram corresponding to the execution of the color mode. In this image forming apparatus, when an image formation command is given from an external apparatus such as a host computer to a main controller MC having a CPU and memories, the main controller MC feeds a control signal and the like to an engine controller EC and feeds video data VD corresponding to the image formation command to a head controller HC. This head controller HC controls line heads 29 of the respective colors based on the video data VD from the main controller MC, a vertical synchronization signal Vsync from the engine controller EC and parameter values from the engine controller EC. In this way, an engine part EG performs a specified image forming operation to form an image corresponding to the image formation command on a sheet such as a copy sheet, transfer sheet, form sheet or transparent sheet for OHP.

An electrical component box 5 having a power supply circuit board, the main controller MC, the engine controller EC and the head controller HC built therein is disposed in a housing main body 3 of the image forming apparatus. An image forming unit 7, a transfer belt unit 8 and a sheet feeding unit 11 are also arranged in the housing main body 3. A secondary transfer unit 12, a fixing unit 13 and a sheet guiding member 15 are arranged at the right side in the housing main body 3 in FIG. 3. It should be noted that the sheet feeding unit 11 is detachably mountable into the housing main body 3. The sheet feeding unit 11 and the transfer belt unit 8 are so constructed as to be detachable for repair or exchange respectively.

The image forming unit 7 includes four image forming stations Y (for yellow), M (for magenta), C (for cyan) and K (for black) which form a plurality of images having different colors. Each of the image forming stations Y, M, C and K includes a cylindrical photosensitive drum 21 having a surface of a specified length in a main scanning direction MD. Each of the image forming stations Y, M, C and K forms a toner image of the corresponding color on the surface of the photosensitive drum 21. The photosensitive drum is arranged so that the axial direction thereof is substantially parallel to the main scanning direction MD. Each photosensitive drum 21 is connected to its own driving motor and is driven to rotate at a specified speed in a direction of arrow D21 in FIG. 3, whereby the surface of the photosensitive drum 21 is transported in the sub scanning direction SD which is orthogonal to or substantially orthogonal to the main scanning direction MD. Further, a charger 23, the line head 29, a developer 25 and a photosensitive drum cleaner 27 are arranged in a rotating direction around each photosensitive drum 21. A charging operation, a latent image forming operation and a toner developing operation are performed by these functional sections. Accordingly, a color image is formed by superimposing toner images formed by all the image forming stations Y, M, C and K on a transfer belt 81 of the transfer belt unit 8 at the time of executing the color mode, and a monochromatic image is formed using only a toner image formed by the image forming station K at the time of executing the monochromatic mode. Meanwhile, since the respective image forming stations of the image forming unit 7 are identically constructed, reference characters are given to only some of the image forming stations while being not given to the other image forming stations in order to facilitate the diagrammatic representation in FIG. 3.

The charger 23 includes a charging roller having the surface thereof made of an elastic rubber. This charging roller is constructed to be rotated by being held in contact with the surface of the photosensitive drum 21 at a charging position. As the photosensitive drum 21 rotates, the charging roller is rotated at the same circumferential speed in a direction driven by the photosensitive drum 21. This charging roller is connected to a charging bias generator (not shown) and charges the surface of the photosensitive drum 21 at the charging position where the charger 23 and the photosensitive drum 21 are in contact upon receiving the supply of a charging bias from the charging bias generator.

The line head 29 is arranged relative to the photosensitive drum 21 so that the longitudinal direction thereof corresponds to the main scanning direction MD and the width direction thereof corresponds to the sub scanning direction SD. Hence, the longitudinal direction of the line head 29 is substantially parallel to the main scanning direction MD. The line head 29 includes a plurality of light emitting elements arrayed in the longitudinal direction and is positioned separated from the photosensitive drum 21. Light beams are emitted from these light emitting elements toward the surface of the photosensitive drum 21 charged by the charger 23, thereby forming an electrostatic latent image on this surface.

The developer 25 includes a developing roller 251 carrying toner on the surface thereof. By a development bias applied to the developing roller 251 from a development bias generator (not shown) electrically connected to the developing roller 251, charged toner is transferred from the developing roller 251 to the photosensitive drum 21 to develop the latent image formed by the line head 29 at a development position where the developing roller 251 and the photosensitive drum 21 are in contact.

The toner image developed at the development position in this way is primarily transferred to the transfer belt 81 at a primary transfer position TR1 to be described later where the transfer belt 81 and each photosensitive drum 21 are in contact after being transported in the rotating direction D21 of the photosensitive drum 21.

Further, the photosensitive drum cleaner 27 is disposed in contact with the surface of the photosensitive drum 21 downstream of the primary transfer position TR1 and upstream of the charger 23 with respect to the rotating direction D21 of the photosensitive drum 21. This photosensitive drum cleaner 27 removes the toner remaining on the surface of the photosensitive drum 21 to clean after the primary transfer by being held in contact with the surface of the photosensitive drum.

The transfer belt unit 8 includes a driving roller 82, a driven roller (blade facing roller) 83 arranged to the left of the driving roller 82 in FIG. 3, and the transfer belt 81 mounted on these rollers. The transfer belt unit 8 also includes four primary transfer rollers 85Y, 85M, 85C and 85K arranged to face in a one-to-one relationship with the photosensitive drums 21 of the respective image forming stations Y, M, C and K inside the transfer belt 81 when the photosensitive cartridges are mounted. These primary transfer rollers 85Y, 85M, 85C and 85K are respectively electrically connected to a primary transfer bias generator (not shown). As described in detail later, at the time of executing the color mode, all the primary transfer rollers 85Y, 85M, 85C and 85K are positioned on the sides of the image forming stations Y, M, C and K as shown in FIG. 3, whereby the transfer belt 81 is pressed into contact with the photosensitive drums 21 of the image forming stations Y, M, C and K to form the primary transfer positions TR1 between the respective photosensitive drums 21 and the transfer belt 81. By applying primary transfer biases from the primary transfer bias generator to the primary transfer rollers 85Y, 85M, 85C and 85K at suitable timings, the toner images formed on the surfaces of the respective photosensitive drums 21 are transferred to the surface of the transfer belt 81 at the corresponding primary transfer positions TR1 to form a color image.

On the other hand, out of the four primary transfer rollers 85Y, 85M, 85C and 85K, the color primary transfer rollers 85Y, 85M, 85C are separated from the facing image forming stations Y, M and C and only the monochromatic primary transfer roller 85K is brought into contact with the image forming station K at the time of executing the monochromatic mode, whereby only the monochromatic image forming station K is brought into contact with the transfer belt 81. As a result, the primary transfer position TR1 is formed only between the monochromatic primary transfer roller 85K and the image forming station K. By applying a primary transfer bias at a suitable timing from the primary transfer bias generator to the monochromatic primary transfer roller 85K, the toner image formed on the surface of the photosensitive drum 21 is transferred to the surface of the transfer belt 81 at the primary transfer position TR1 to form a monochromatic image.

The transfer belt unit 8 further includes a downstream guide roller 86 disposed downstream of the monochromatic primary transfer roller 85K and upstream of the driving roller 82. This downstream guide roller 86 is so disposed as to come into contact with the transfer belt 81 on an internal common tangent to the primary transfer roller 85K and the photosensitive drum 21 at the primary transfer position TR1 formed by the contact of the monochromatic primary transfer roller 85K with the photosensitive drum 21 of the image forming station K.

The driving roller 82 drives to rotate the transfer belt 81 in the direction of the arrow D81 and doubles as a backup roller for a secondary transfer roller 121. A rubber layer having a thickness of about 3 mm and a volume resistivity of 1000 kΩ·cm or lower is formed on the circumferential surface of the driving roller 82 and is grounded via a metal shaft, thereby serving as an electrical conductive path for a secondary transfer bias to be supplied from an unillustrated secondary transfer bias generator via the secondary transfer roller 121. By providing the driving roller 82 with the rubber layer having high friction and shock absorption, an impact caused upon the entrance of a sheet into a contact part (secondary transfer position TR2) of the driving roller 82 and the secondary transfer roller 121 is unlikely to be transmitted to the transfer belt 81 and image deterioration can be prevented.

The sheet feeding unit 11 includes a sheet feeding section which has a sheet cassette 77 capable of holding a stack of sheets, and a pickup roller 79 which feeds the sheets one by one from the sheet cassette 77. The sheet fed from the sheet feeding section by the pickup roller 79 is fed to the secondary transfer position TR2 along the sheet guiding member 15 after having a sheet feed timing adjusted by a pair of registration rollers 80.

The secondary transfer roller 121 is provided freely to abut on and move away from the transfer belt 81, and is driven to abut on and move away from the transfer belt 81 by a secondary transfer roller driving mechanism (not shown). The fixing unit 13 includes a heating roller 131 which is freely rotatable and has a heating element such as a halogen heater built therein, and a pressing section 132 which presses this heating roller 131. The sheet having an image secondarily transferred to the front side thereof is guided by the sheet guiding member 15 to a nip portion formed between the heating roller 131 and a pressure belt 1323 of the pressing section 132, and the image is thermally fixed at a specified temperature in this nip portion. The pressing section 132 includes two rollers 1321 and 1322 and the pressure belt 1323 mounted on these rollers. Out of the surface of the pressure belt 1323, a part stretched by the two rollers 1321 and 1322 is pressed against the circumferential surface of the heating roller 131, thereby forming a sufficiently wide nip portion between the heating roller 131 and the pressure belt 1323. The sheet having been subjected to the image fixing operation in this way is transported to the discharge tray 4 provided on the upper surface of the housing main body 3.

Further, a cleaner 71 is disposed facing the blade facing roller 83 in this apparatus. The cleaner 71 includes a cleaner blade 711 and a waste toner box 713. The cleaner blade 711 removes foreign matters such as toner remaining on the transfer belt after the secondary transfer and paper powder by holding the leading end thereof in contact with the blade facing roller 83 via the transfer belt 81. Foreign matters thus removed are collected into the waste toner box 713. Further, the cleaner blade 711 and the waste toner box 713 are constructed integral to the blade facing roller 83. Accordingly, when the blade facing roller 83 moves, the cleaner blade 711 and the waste toner box 713 move together with the blade facing roller 83.

Figure 5:
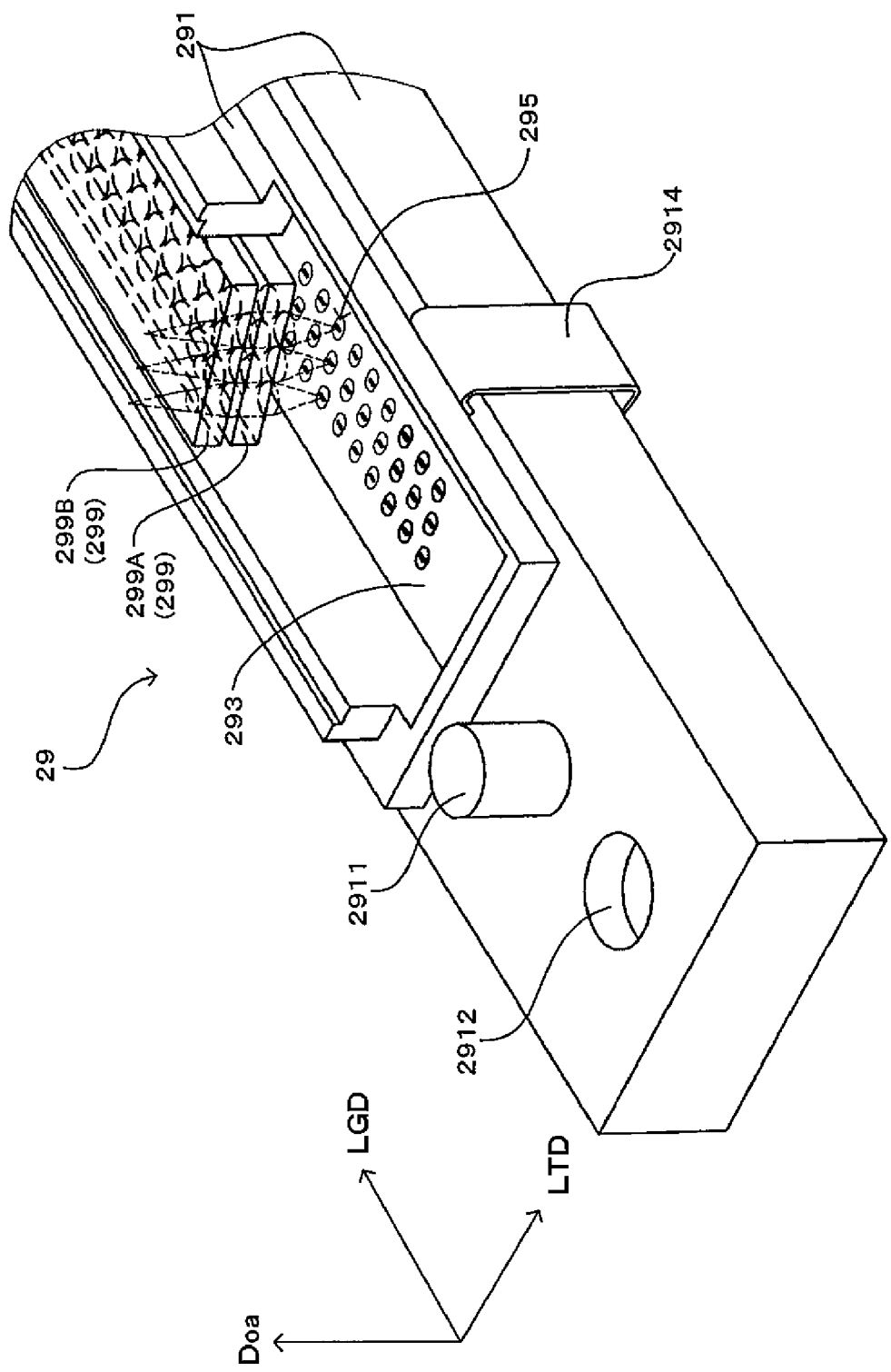
FIG. 5 is a perspective view schematically showing a line head according to the invention.
Figure 6:
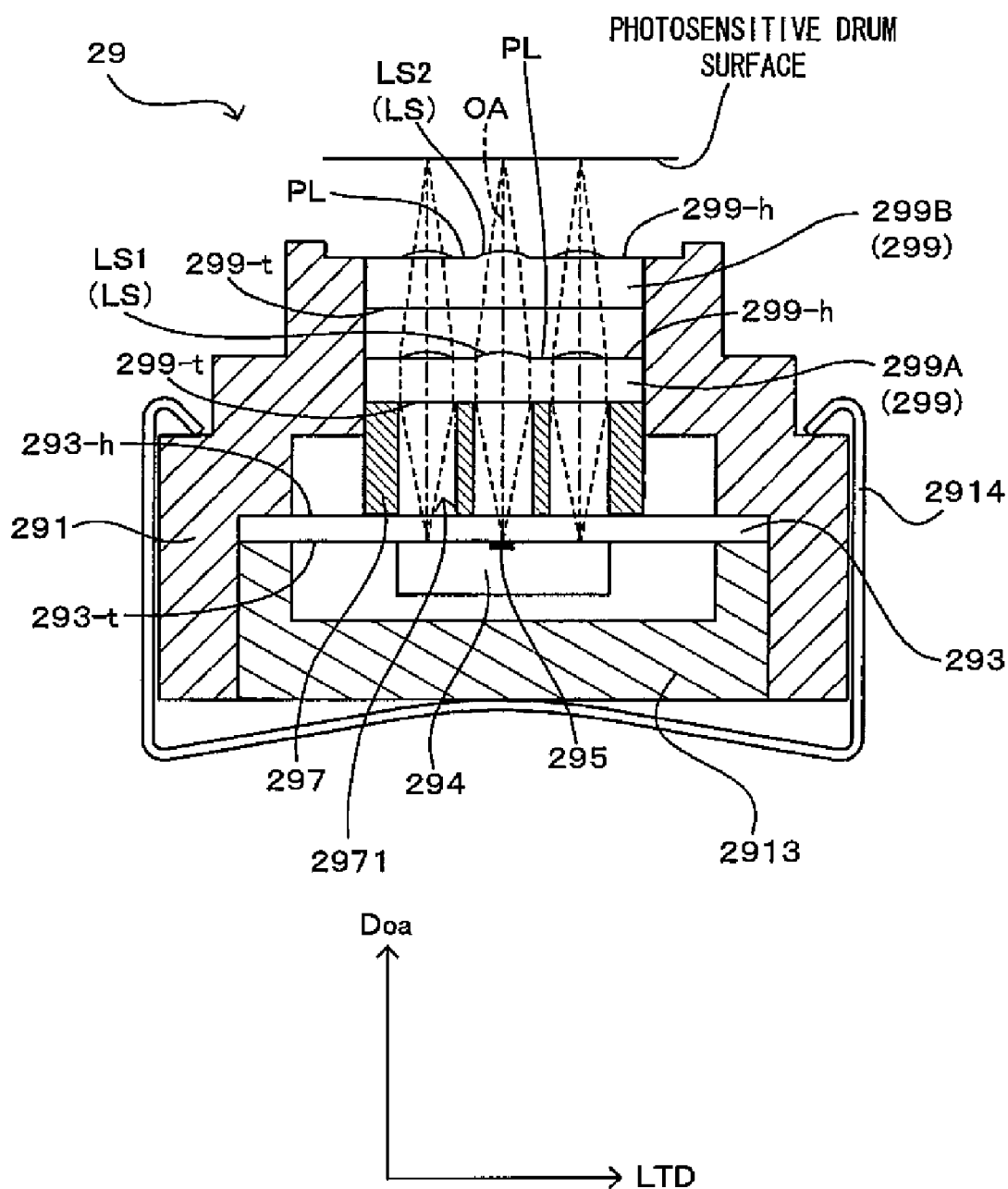
FIG. 6 is a sectional view along a width direction of the line head shown in FIG. 5.

FIG. 5 is a perspective view schematically showing a line head according to the invention, and FIG. 6 is a sectional view along a width direction of the line head shown in FIG. 5. As described above, the line head 29 is arranged relative to the photosensitive drum 21 such that the longitudinal direction LGD thereof corresponds to the main scanning direction MD and the width direction LTD thereof corresponds to the sub scanning direction SD. The longitudinal direction LGD and the width direction LTD are orthogonal to or substantially orthogonal to each other. As described later, in this line head 29, a plurality of light emitting elements are formed on the head substrate 293 and the respective light emitting elements emit light beams toward the surface of the photosensitive drum 21. Accordingly, in this specification, a direction orthogonal to the longitudinal direction LGD and the width direction LTD and propagating from the light emitting elements toward the photosensitive drum surface is referred to as a light beam propagation direction Doa. This light beam propagation direction Doa is parallel to or substantially parallel to optical axes OA to be described later.

The line head 29 includes a case 291, and a positioning pin 2911 and a screw insertion hole 2912 are provided at each of the opposite ends of such a case 291 in the longitudinal direction LGD. The line head 29 is positioned relative to the photosensitive drum 21 by fitting such positioning pins 2911 into positioning holes (not shown) perforated in a photosensitive drum cover (not shown) covering the photosensitive drum 21 and positioned relative to the photosensitive drum 21. Further, the line head 29 is positioned and fixed relative to the photosensitive drum 21 by screwing fixing screws into screw holes (not shown) of the photosensitive drum cover via the screw insertion holes 2912 to be fixed.

The head substrate 293, a light shielding member 297 and two lens arrays 299 (299A, 299B) are arranged in the case 291. The inner side of the case 291 is held in contact with a top surface 293-$h$ of the head substrate 293, whereas an under lid 2913 is held in contact with an under surface 293-$t$ of the head substrate 293. This under lid 2913 is pressed against the inner side of the case 291 via the head substrate 293 by fixing devices 2914. In other words, the fixing devices 2914 have elastic forces for pressing the under lid 2913 toward the inner side (upper side in FIG. 6) of the case 291 and the interior of the case 291 is light-tightly sealed (in other words, so that light does not leak from the interior of the case 291 and light does not enter the case 291 from the outside) by the under lid being pressed by such elastic forces. The fixing devices 2914 are provided at a plurality of positions spaced apart in the longitudinal direction LGD of the case 291.

The light emitting element groups 295 formed by grouping a plurality of light emitting elements are provided on the under surface 293-$t$ of the head substrate 293. The head substrate 293 is made of a light transmissive material such as glass, and light beams emitted from the respective light emitting elements of the light emitting element groups 295 can transmit from the under surface 293-$t$ of the head substrate 293 to the top surface 293-$h$ thereof. These light emitting elements are bottom emission-type organic EL (electro-luminescence) devices and are covered by a sealing member 294. The detailed arrangement of the light emitting elements on the under surface 293-$t$ of the head substrate 293 is as follows.

Figure 7:
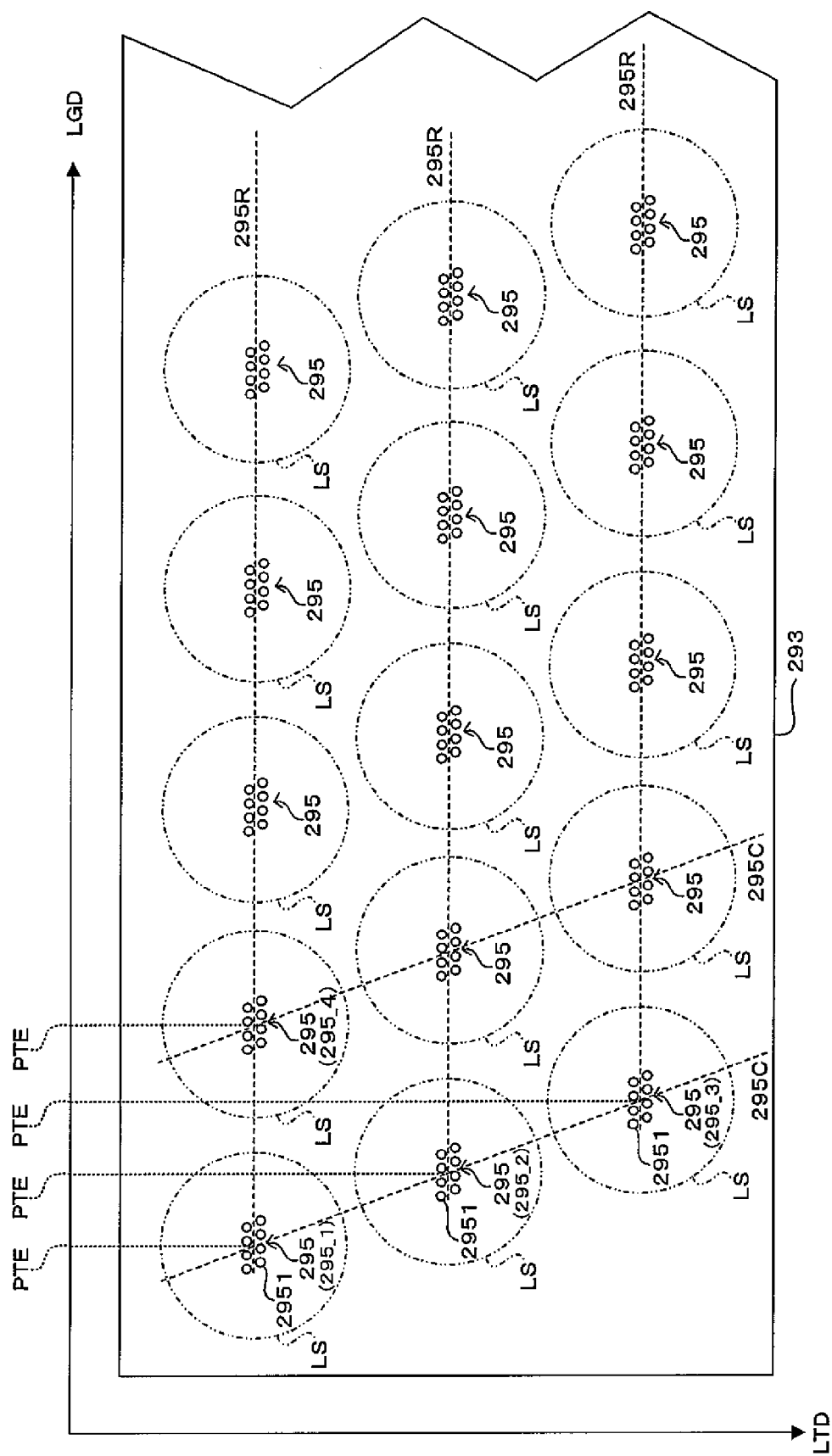
FIG. 7 is a diagram showing the configuration of the under surface of the head substrate.
Figure 8:
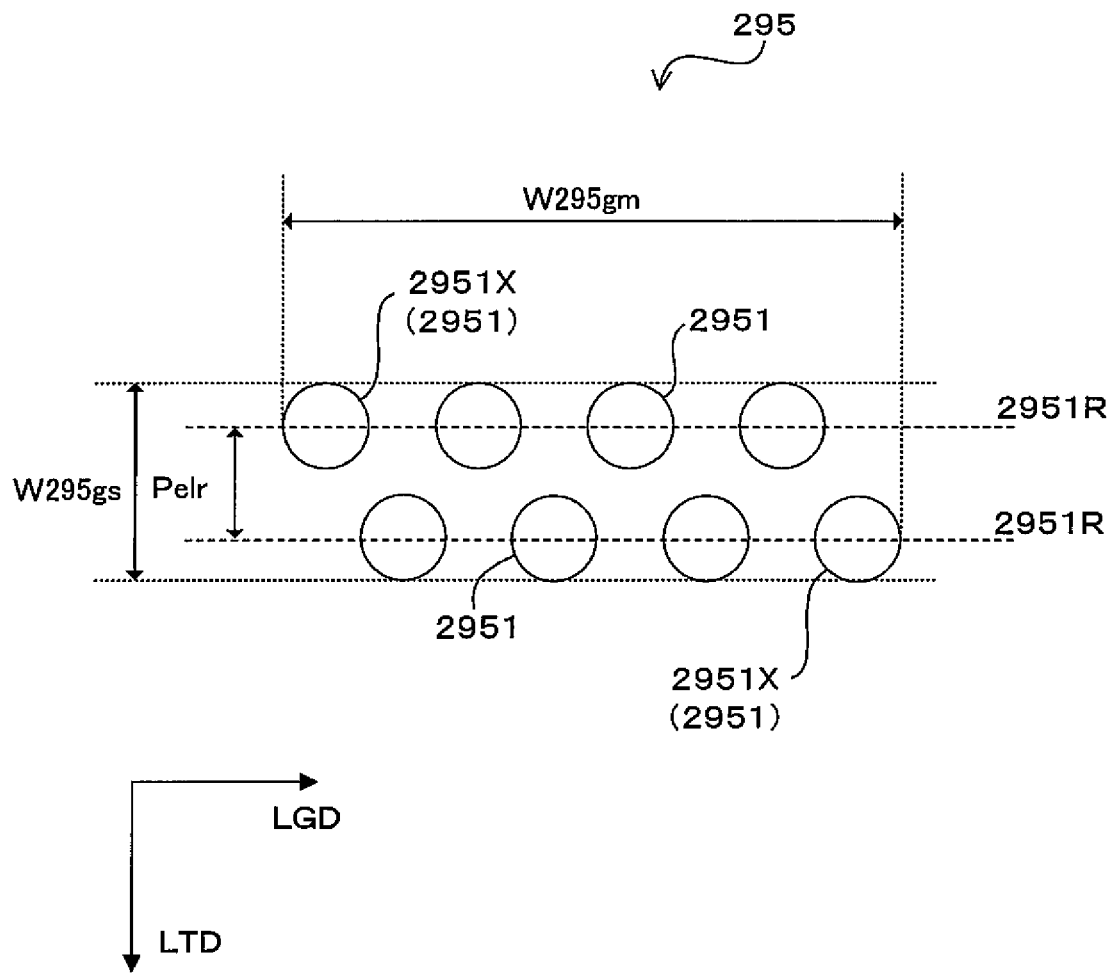
FIG. 8 is a diagram showing the configuration of the light emitting element group provided on the under surface of the head substrate.

FIG. 7 is a diagram showing the configuration of the under surface of the head substrate and corresponds to a case where the under surface is seen from the top surface of the head substrate. FIG. 8 is a diagram showing the configuration of the light emitting element group provided on the under surface of the head substrate. Although the lenses LS are shown by chain double-dashed line in FIG. 7, this is to show that the light emitting element groups 295 are provided in a one-to-one correspondence with the lenses LS, but not to show that the lenses LS are arranged on the under surface of the head substrate. As shown in FIG. 7, the light emitting element group 295 is formed by grouping eight light emitting elements 2951. In each light emitting element group 295, eight light emitting elements 2951 are arranged as follows. Specifically, as shown in FIG. 8, in the light emitting element group 295, four light emitting elements 2951 are aligned in the longitudinal direction LGD to form a light emitting element row 2951R and two light emitting element rows 2951R are arranged at a light emitting element row pitch Pelr in the width direction LTD. The respective light emitting element rows 2951R are displaced from each other in the longitudinal direction LGD, so that the positions of the respective light emitting elements 2951 in the longitudinal direction LGD differ from each other. The light emitting element group 295 thus configured has a longitudinal light emitting element group width W295$gm$ in the longitudinal direction LGD and a widthwise light emitting element group width W295$gs$ in the width direction LTD, wherein the longitudinal light emitting element group width W295$gm$ is larger than the widthwise light emitting element group width W295$gs$.

A plurality of light emitting element groups 295 thus configured are arranged on the under surface 293-$t$ of the head substrate 293. Specifically, a plurality of light emitting element group columns 295C, in each of which three light emitting element groups 295 are arranged at positions mutually different in the width direction LTD, are arranged in the longitudinal direction LGD. In other words, three light emitting element group rows 295R each formed by aligning a plurality of light emitting element groups 295 in the longitudinal direction LGD are arranged in the width direction LTD. The respective light emitting element group rows 295R are displaced from each other in the longitudinal direction LGD, so that positions PTE of the respective light emitting element groups 295 in the longitudinal direction LGD mutually differ. Thus, in this embodiment, a plurality of light emitting element groups 295 are two-dimensionally arranged on the head substrate 293. In FIG. 7, the positions of the light emitting element groups 295 are represented by the center of gravity positions of the light emitting element groups 295, and the positions PTE of the light emitting element groups 295 in the longitudinal direction LGD are indicated by feet of perpendiculars to an axis of the longitudinal direction LGD from the positions of the light emitting element groups 295.

The respective light emitting elements 2951 formed on the head substrate 293 in this way emit light beams having an equal wavelength upon being driven, for example, by a TFT (Thin Film Transistor) circuit or the like. The light emitting surfaces of the light emitting elements 2951 are so-called perfectly diffusing surface illuminants and the light beams emitted from the light emitting surfaces comply with Lambert's cosine law.

Referring back to FIGS. 5 and 6, description continues. The light shielding member 297 is arranged in contact with the top surface 293-h of the head substrate 293. The light shielding member 297 is provided with light guide holes 2971 for the respective plurality of light emitting element groups 295. In other words, a plurality of light guide holes 2971 are formed in a one-to-one correspondence with the plurality of light emitting element groups 295. The light guide holes 2971 are formed as substantially cylindrical holes penetrating the light shielding member 297 in the light beam propagation direction Doa. Further, two lens arrays 299 are arranged side by side in the light beam propagation direction Doa above the light shielding member 297 (at a side opposite to the head substrate 293).

As described above, the light shielding member 297 provided with the light guide holes 2971 for the respective light emitting element groups 295 is arranged between the light emitting element groups 295 and the lens arrays 299 in the light beam propagation direction Doa. Accordingly, light beams emitted from the light emitting element groups 295 propagate toward the lens arrays 299 through the light guide holes 2971 corresponding to the light emitting element groups 295. Conversely speaking, out of the light beams emitted from the light emitting element groups 295, those propagating toward other than the light guide holes 2971 corresponding to the light emitting element groups 295 are shielded by the light shielding member 297. In this way, all the lights emitted from one light emitting element group 295 propagate toward the lens arrays 299 via the same light guide hole 2971 and the mutual interference of the light beams emitted from different light emitting element groups 295 is prevented by the light shielding member 297.

Figure 9:
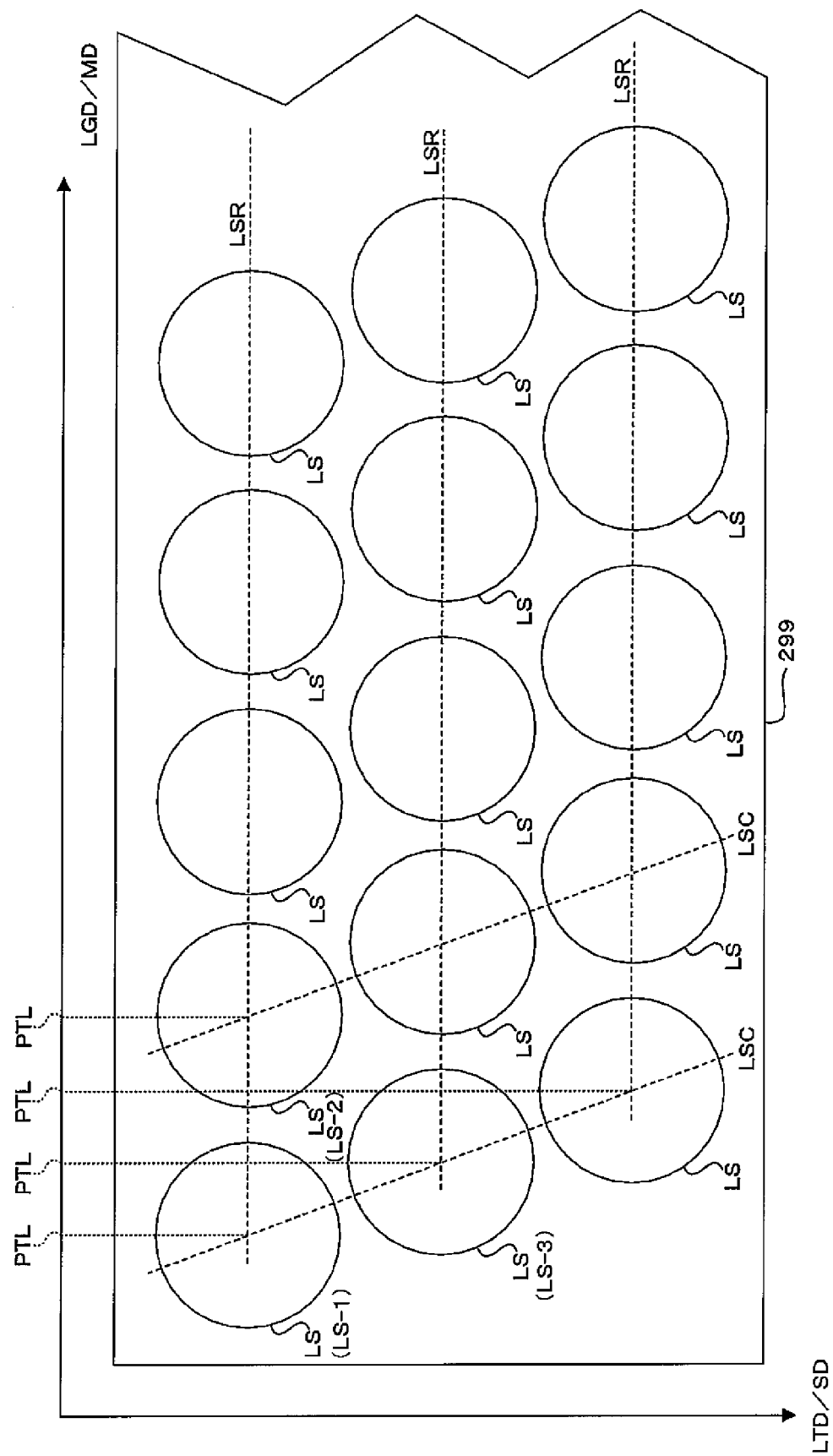
FIG. 9 is a plan view of the lens array.

FIG. 9 is a plan view of the lens array and corresponds to a case where the lens array is seen from an image plane side (upper side in FIG. 6). In the lens array 299, the lenses LS are provided for the respective light emitting element groups 295. Specifically, as shown in FIG. 9, in the lens array 299, a plurality of lens columns LSC each made up of three lenses LS arranged at different positions in the width direction LTD are arranged in the longitudinal direction LGD. In other words, in the lens array 299, three lens rows LSR each formed by aligning a plurality of lenses LS in the longitudinal direction LGD are arranged in the width direction LTD. The respective lens rows LSR are displaced from each other in the longitudinal direction LGD, so that positions PTL of the respective lenses LS in the longitudinal direction LGD mutually differ. In this way, a plurality of lenses LS are two-dimensionally arranged in the lens array 299. In FIG. 9, the positions of the lenses LS are represented by the centers of lens surfaces LSF of the lenses LS and the positions PTL of the lenses LS in the longitudinal direction LGD are represented by feet of perpendiculars to the axis of the longitudinal direction LGD from the centers of the lenses LS.

Figure 10:
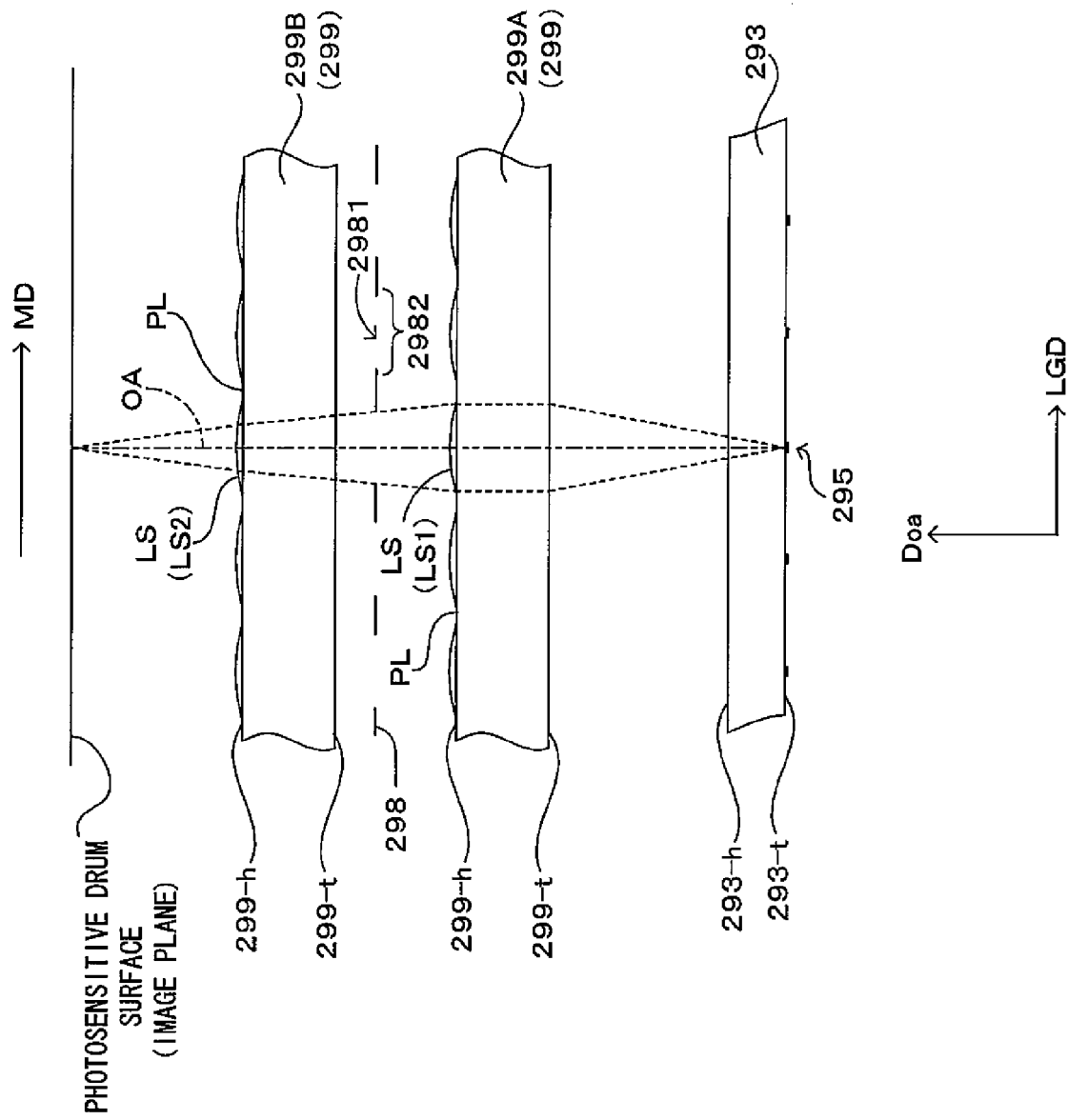
FIG. 10 is a longitudinal sectional view of the lens arrays, the head substrate and the like showing a longitudinal cross section including an optical axis of the lens formed in the lens array.

FIG. 10 is a longitudinal sectional view of the lens arrays, the head substrate and the like showing a longitudinal cross section including an optical axis of the lens LS formed in the lens array. Each lens array 299 has a top surface 299-h and an under surface 299-t, and the lenses LS are formed on the top surface 299-h for the respective light emitting element groups 295. Accordingly, portions with a finite curvature where the lenses LS are formed and flat portions PL with an infinite curvature by having no lenses LS formed are present on the top surface 299-h. This lens array 299 is formed by a method disclosed in JP-A-2005-276849 for example. Specifically, a mold formed with recesses in conformity with the shape of the lenses LS is held in contact with a light transmissive substrate as a lens substrate 2991. For example, a glass substrate can be used as this light transmissive substrate. A clearance between the mold and the light transmissive substrate is filled with a light curing resin. When light is irradiated to this light curing resin, the light curing resin is solidified and the lenses LS are formed on the light transmissive substrate. After the lenses are formed by solidifying the light curing resin, the mold is released. In this way, the lens array 299 can be formed using the mold.

In this line head 29, two lens arrays 299 (299A, 299B) having such a configuration are arranged side by side in the light beam propagation direction Doa, so that two lenses LS1, LS2 aligned in the light propagation direction Doa are arranged for each light emitting element group 295 (FIGS. 5, 6 and 10). An optical axis OA (chain double-dashed line in FIG. 10) passing the centers of the first and second lenses LS1, LS2 corresponding to the same light emitting element group 295 is orthogonal to or substantially orthogonal to the under surface 293-t of the head substrate 293. Here, the lens LS of the line head 299A upstream in the light beam propagation direction Doa is the first lens LS1, and that of the line head 299B downstream in the light beam propagation direction Doa is the second lens LS2. In this way, since a plurality of lens arrays 299 are arranged side by side in the light beam propagation direction Doa in this embodiment, a degree of freedom in optical design can be increased.

Although not shown in FIGS. 5 and 6, an aperture plate 298 is provided between the lens arrays 299A and 299B in the light beam propagation direction Doa and is perforated with aperture openings 2981 for the respective light emitting element groups 295. In the aperture plate 298, the aperture openings 2981 and their peripheral parts are called "apertures 2982". That is, the apertures 2982 are provided for the respective light emitting element groups 295.

As described above, the line head 29 is provided with an imaging optical system including the first and the second lenses LS1, LS2 and the apertures 2982. Accordingly, light beams emitted from the light emitting element groups 295 are narrowed down by the apertures 2982 (aperture plate 298) to be incident on the second lenses LS2 after passing the first lenses LS1. In this way, the light beams are imaged by the first and the second lenses LS1, LS2 to form spots SP on the photosensitive drum surface (image plane). On the other hand, the photosensitive drum surface is charged by the charger 23 prior to spot formation as described above. Thus, areas where the spots SP are formed are neutralized to form spot latent images Lsp. The spot latent images Lsp thus formed are conveyed toward a downstream side in the sub scanning direction SD while being carried on the photosensitive drum surface. As described in the next "C. Basic Operation", the spots SP are formed at timings in conformity with the movement of the photosensitive drum surface to form a plurality of spot latent images Lsp aligned in the main scanning direction MD.

C. Basic Operation

Figure 11:
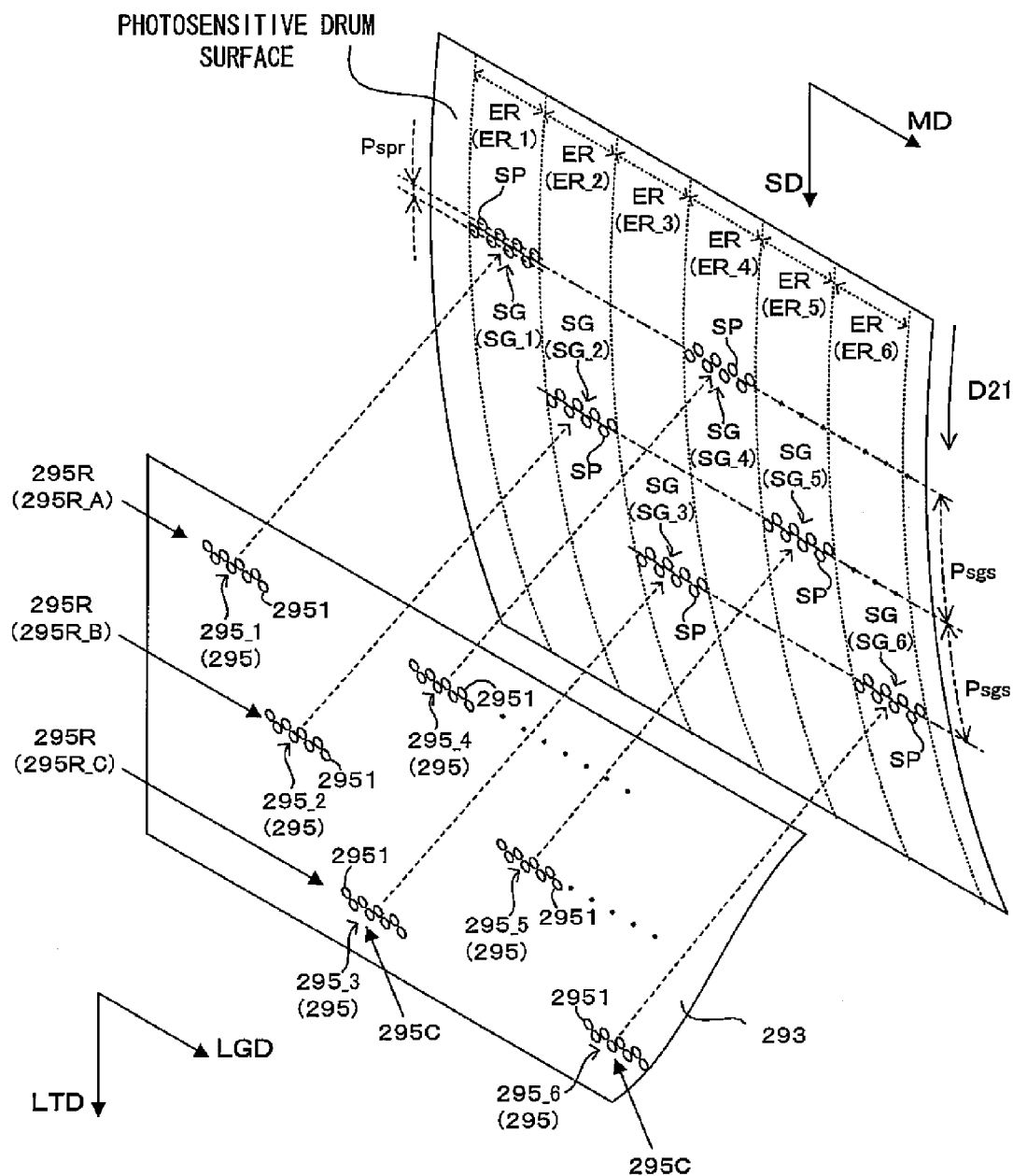
FIG. 11 is a perspective view showing spots formed by the line head.

FIG. 11 is a perspective view showing spots formed by the line head. The lens array 299 is not shown in FIG. 11. As shown in FIG. 11, the respective light emitting element groups 295 can form the spot groups SG in exposure regions ER mutually different in the main scanning direction MD. Here, the spot group SG is a set of a plurality of spots SP formed by the simultaneous light emissions of all the light emitting elements 2951 of the light emitting element group 295. As shown in FIG. 11, three light emitting element groups 295 capable of forming the spot groups SG in the exposure regions ER consecutive in the main scanning direction MD are displaced from each other in the width direction LTD. In other words, three light emitting element groups 295_1, 295_2 and 295_3 capable of forming spot groups SG_1, SG_2 and SG_3, for example, in exposure regions ER_1, ER_2 and ER_3 consecutive in the main scanning direction MD are displaced from each other in the width direction LTD. These three light emitting element groups 295 constitute the light emitting element group column 295C, and a plurality of light emitting element group columns 295C are arranged in the longitudinal direction LGD. As a result, three light emitting element group rows 295R_A, 295R_B and 295R_C are arranged in the width direction LTD and the respective light emitting element group rows 295R_A, etc. form the spot groups SG at positions mutually different in the sub scanning direction SD as already described in the description of FIG. 7.

Specifically, in this line head 29, the plurality of light emitting element groups 295 (for example, light emitting element groups 295_1, 295_2, 295_3) are arranged at positions mutually different in the width direction LTD. The respective light emitting element groups 295 arranged at the positions mutually different in the width direction LTD form spot groups SG (for example, spot groups SG_1, SG_2, SG_3) at positions mutually different in the sub scanning direction SD.

In other words, in this line head 29, the plurality of light emitting elements 2951 are arranged at positions mutually different in the width direction LTD. For example, the light emitting elements 2951 belonging to the light emitting element group 295_1 and those belonging to the light emitting element group 295_2 are arranged at positions mutually different in the width direction LTD. The respective light emitting elements 2951 arranged at the positions mutually different in the width direction LTD form spots SP at positions mutually different in the sub scanning direction SD. For example, spots SP belonging to the spot group SG_1 and those belonging to the spot group SG_2 are formed at positions mutually different in the sub scanning direction SD.

In this way, the formation positions of the spots SP in the sub scanning direction SD differ depending on the light emitting elements 2951. Accordingly, in order to form a plurality of spot latent images Lsp side by side in the main scanning direction MD (that is, in order to form a plurality of spot latent images Lsp side by side at the same position in the sub scanning direction SD), differences in such spot formation positions need to be considered. Thus, in this line head 29, the respective light emitting elements 2951 are driven at timings in conformity with the movement of the photosensitive drum surface.

Figure 12:
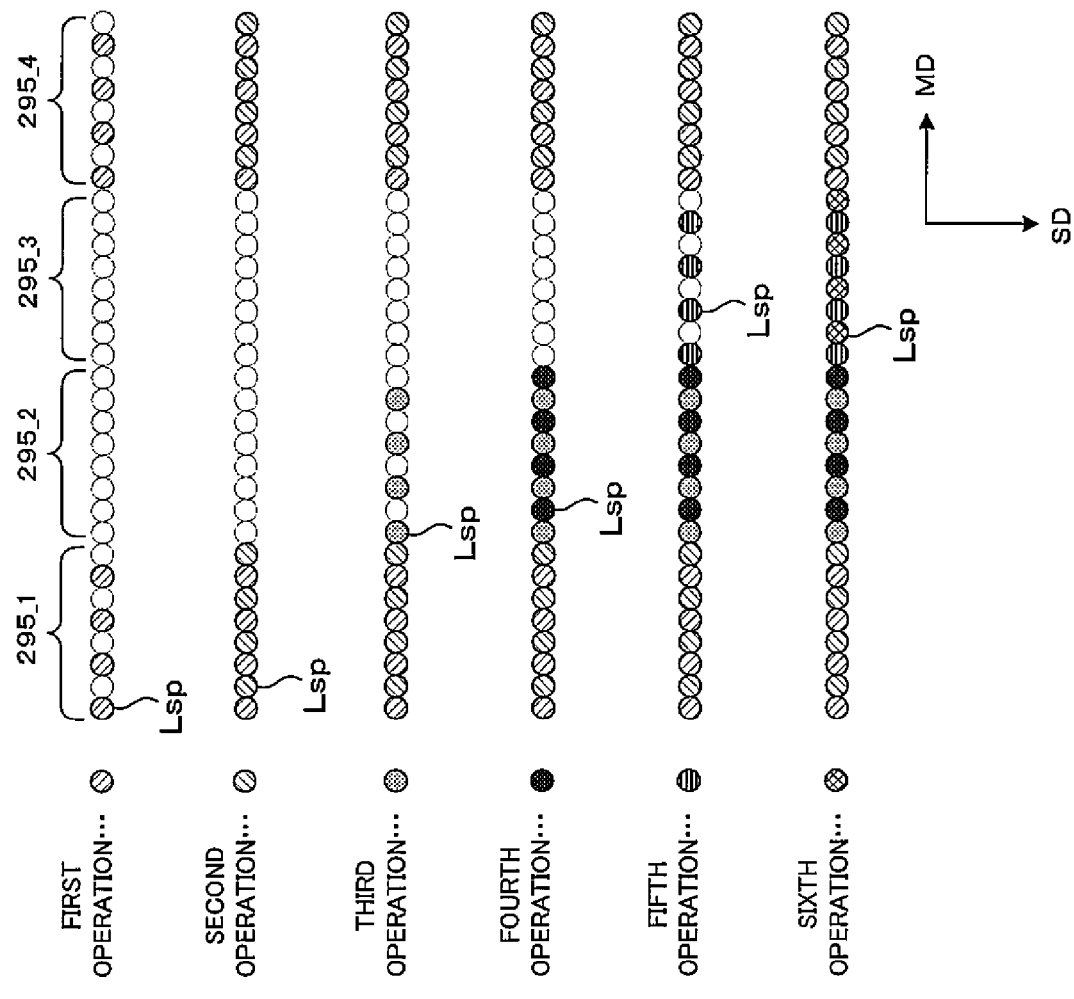
FIG. 12 is a diagram showing a spot forming operation by the above line head.

FIG. 12 is a diagram showing a spot forming operation by the above line head. The spot forming operation by the line head is described with reference to FIGS. 7, 11 and 12. Briefly, the photosensitive drum surface (latent image carrier surface) is moved in the sub scanning direction SD and the head control module 54 (FIG. 4) drives the light emitting elements 2951 for light emission at timings in conformity with the movement of the photosensitive drum surface, whereby a plurality of spot latent images Lsp arranged in the main scanning direction MD are formed.

First of all, out of the light emitting element rows 2951R (FIG. 11) belonging to the most upstream light emitting element groups 295_1, 295_4, and the like in the width direction LTD, the light emitting element rows 2951R downstream in the width direction LTD are driven for light emission. A plurality of light beams emitted by such a light emitting operation are imaged by the lenses LS to form spots SP on the photosensitive drum surface. The lenses LS have an inversion characteristic, so that the light beams from the light emitting elements 2951 are imaged in an inverted manner. In this way, spot latent images Lsp are formed at hatched positions of a "First Operation" of FIG. 12. In FIG. 12, white circles represent spots that are not formed yet, but planned to be formed later. In FIG. 12, spots labeled by reference numerals 295_1 to 295_4 are those to be formed by the light emitting element groups 295 corresponding to the respective attached reference numerals.

Subsequently, out of the light emitting element rows 2951R belonging to the most upstream light emitting element groups 295_1, 295_4, and the like in the width direction, the light emitting element rows 2951R upstream in the width direction LTD are driven for light emission. A plurality of light beams emitted by such a light emitting operation are imaged by the lenses LS to form spots SP on the photosensitive drum surface. In this way, spot latent images Lsp are formed at hatched positions of a "Second Operation" of FIG. 12. Here, the light emitting element rows 2951R are successively driven for light emission from the one downstream in the width direction LTD in order to deal with the inversion characteristic of the lenses LS.

Subsequently, out of the light emitting element rows 2951R belonging to the second most upstream light emitting element groups 295_2 and the like in the width direction, the light emitting element rows 2951R downstream in the width direction LTD are driven for light emission. A plurality of light beams emitted by such a light emitting operation are imaged by the lenses LS to form spots SP on the photosensitive drum surface. In this way, spot latent images Lsp are formed at hatched positions of a "Third Operation" of FIG. 12.

Subsequently, out of the light emitting element rows 2951R belonging to the second most upstream light emitting element groups 295_2 and the like in the width direction, the light emitting element rows 2951R upstream in the width direction LTD are driven for light emission. A plurality of light beams emitted by such a light emitting operation are imaged by the lenses LS to form spots SP on the photosensitive drum surface. In this way, spot latent images Lsp are formed at hatched positions of a "Fourth Operation" of FIG. 12.

Subsequently, out of the light emitting element rows 2951R belonging to the third most upstream light emitting element groups 295_3 and the like in the width direction, the light emitting element rows 2951R downstream in the width direction LTD are driven for light emission. A plurality of light beams emitted by such a light emitting operation are imaged by the lenses LS to form spots SP on the photosensitive drum surface. In this way, spot latent images Lsp are formed at hatched positions of a "Fifth Operation" of FIG. 12.

Finally, out of the light emitting element rows 2951R belonging to the third most upstream light emitting element groups 295_3 and the like in the width direction, the light emitting element rows 2951R upstream in the width direction LTD are driven for light emission. A plurality of light beams emitted by such a light emitting operation are imaged by the lenses LS to form spots SP on the photosensitive drum surface. In this way, spot latent images Lsp are formed at hatched positions of a "Sixth Operation" of FIG. 12. By performing the first to sixth light emitting operations in this way, a plurality of spots SP are successively formed from the upstream ones in the sub scanning direction SD to form a plurality of spot latent images Lsp aligned in the main scanning direction MD.

D. Construction Required for Lens Array

As described above, in the lens array 299, a plurality of lenses LS are two-dimensionally arranged. Accordingly, a construction required for such a lens array 299 is thought. As generally known, a diameter "a" at which airy disk intensity is zero is determined by the following formula due to the influence of light diffraction.

$$a = 1.22 \cdot \lambda / NAimg \quad \text{(Formula 1)}$$
$$= 1.22 \cdot \lambda / \sin(\theta)$$

Here, $\lambda$ is the wavelength of the light beams, NAimg is an image-side numerical aperture and $\theta$ is an aperture angle (half angle). Thus, the shape of the spots SP on the image plane is, due to the influence of diffraction, enlarged from the shape determined by the shape of the light emitting elements 2951 as a light source and the aberrations of the optical system. According to this formula 1, the enlargement of the spot SP is about 5.5 [μm] when the aperture angle (half angle) is 8 [degrees] and the wavelength is 630 [nm]. This is equivalent to 25% or more of a pixel pitch (that is, pitch between spot latent images Lsp formed adjacent to each other) in the case of a resolution of 1200 dpi (dots per inch). Thus, in light of performing optical writing at a high resolution, the influence of diffraction on the spot shape is preferably not larger than this. In other words, it is preferable to suppress the enlargement of the spots SP caused by diffraction by setting the image-side aperture angle (half angle) to about 8 [degrees] or larger.

Although the line head 29 is used in proximity to the image plane (surface to be irradiated), a minimum clearance S (spacing between the line head 29 and the image plane) is necessary to avoid problems such as the interference of parts and discharge. In the case of employing an image-side telecentric optical system to make a writing position variation (variation of the positions of the spots SP on the photosensitive drum surface) difficult to occur due to the variation of the clearance S caused by the vibration of the surface of the photosensitive drum 21 or the like, the following formula needs to be satisfied.

$$Wlpm \geq 2 \cdot S \cdot \tan(\theta) \cdot m/(m-1) \quad \text{(Formula 2)}$$

Here, m is the number (row number) of the lens rows LSR. Wlpm is the width of a beam passage area LP on an optical system final surface in the main scanning direction MD (longitudinal direction LGD). The optical system final surface is an optical surface located closest to a non-image plane side. In the optical system shown in FIG. 10, the lens surface of the second lens LS2 corresponds to the optical system final surface. The beam passage area LP is a range where a light beam passes on a target optical surface. How to derive the formula 2 is described later.

In the actual lens array manufacturing, surface accuracy tends to be difficult to obtain near the outer peripheries of lenses. Accordingly, a lens diameter DM is preferably the sum of the width of the beam passage area LP and a margin of about several 10 [μm]. Here, when the margin of the lens diameter is $\alpha$, a lens diameter DMm (main-scanning lens diameter DMm) in the main scanning direction MD (longitudinal direction LGD) is given by the following formula.

$$DMm = Wlpm + \alpha \quad \text{(Formula 3)}$$

In order to suppress interference between the adjacent lenses LS in the lens array 299, width Wsgm of the spot groups SG in the main scanning direction MD (main-scanning spot group width Wsgm) with respect to the main-scanning lens diameter DMm needs to be set in a range determined by the following formula.

$$Wsgm > DMm/m \quad \text{(Formula 4)}$$

Accordingly, when the image-side aperture angle $\theta$ is 8 [degrees], the clearance S is 1 [mm] and the margin $\alpha$ of the lens diameter is 0.1 [mm], the lens diameter and the main-scanning spot group width Wsgm are as follows. Specifically, when the number m of the lens rows LSR is 2, it is necessary that DMm>0.66 [mm] and Wsgm>DMm/2=0.33 [mm]. Further, when the number m of the lens rows LSR is 3, it is necessary that DMm>0.52 [mm] and Wsgm>DMm/3=0.173 [mm]. Furthermore, when the number m of the lens rows LSR is 4, it is necessary that DMm>0.47 [mm] and Wsgm>DMm/4=0.1175 [mm]. In this way, the lens array 299 needs to have such a construction in which the lenses having a diameter of about 0.5 [mm] or larger are two-dimensionally arranged.

Figure 13:
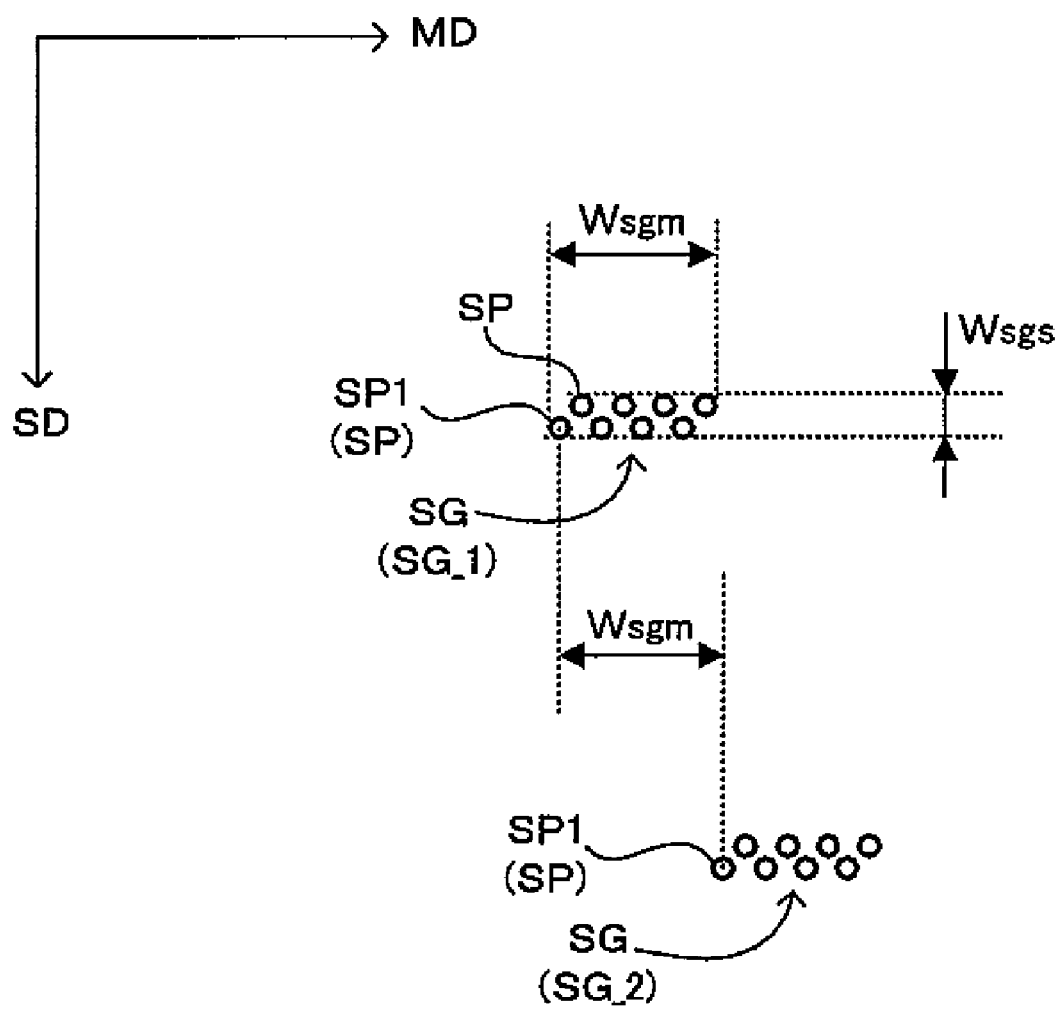
FIG. 13 is a diagram showing the spot groups formed on the image plane.

Here, the formula 2 is derived. This formula 2 is derived from a relation to be satisfied by the spot groups and the lens diameter. Accordingly, after quantities concerning the spot group are described using FIG. 13, the formula 2 is derived using FIGS. 14 and 15. FIG. 13 is a diagram showing the spot groups formed on the image plane. As shown in FIG. 13, the spot group SG has the main-scanning spot group width Wsgm in the main scanning direction MD and a sub-scanning spot group width Wsgs in the sub scanning direction SD. As shown in FIG. 13, this main-scanning spot group width Wsgm can be calculated as a pitch between the first spots SP1 of the two spot groups SG (for example, spot groups SG1, SG2 in FIG. 11) formed in adjacent exposure regions ER. Here, the first spots SP1 are the most upstream spots SP of the respective spot groups SG in the main scanning direction MD.

Figure 14:
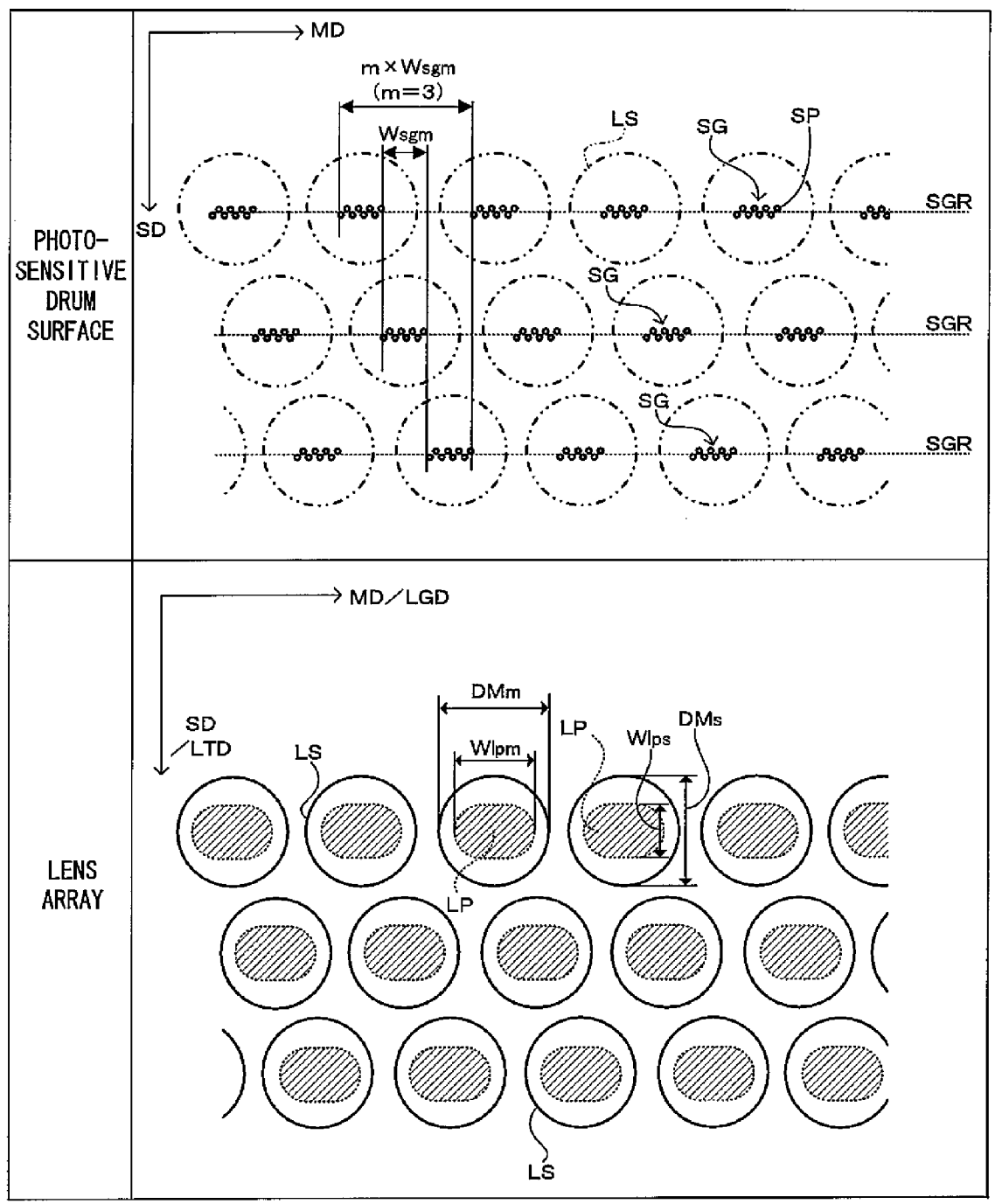
Figure 15:
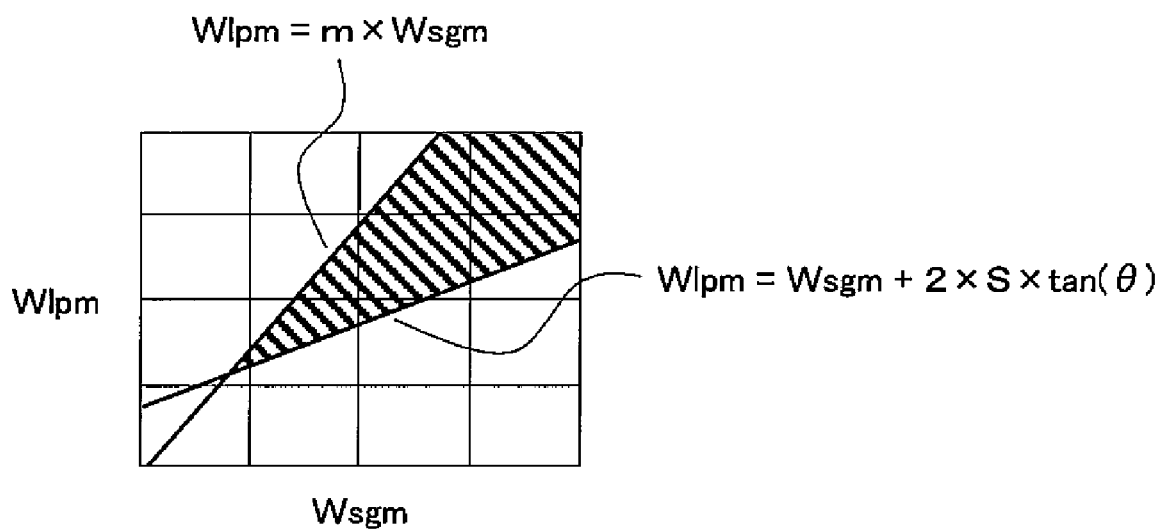
FIG. 15 is a diagram showing a relation of the spot groups and the beam passage areas of the optical system final surfaces.

FIG. 14 is a diagram showing the relation of the spot groups, the lens diameter and the like, and FIG. 15 is a diagram showing a relation of the spot groups and the beam passage areas of the optical system final surfaces. The column "Lens Array" of FIG. 14 shows a relation of the lenses LS and the beam passage areas LP in the lenses LS. Further, the diameter of the lenses LS in the main scanning direction MD (longitudinal direction LGD) is shown as the main-scanning lens diameter DMm and the diameter of the lenses LS in the sub scanning direction SD (width direction LTD) is shown as the sub-scanning lens diameter DMs. Furthermore, the width of the beam passage areas LP in the main scanning direction MD (longitudinal direction LGD) is shown as the main-scanning passage area width Wlpm and the width of the beam passage areas LP in the sub scanning direction SD (width direction LTD) is shown as a sub-scanning passage area width Wlps. As shown in FIG. 8, in the light emitting element group 295, the longitudinal light emitting element group width W295gm is larger than the widthwise light emitting element group width W295gs. Accordingly, the main-scanning passage area width Wlpm is larger than the sub-scanning passage area width Wlps. In the column "Photosensitive Drum Surface" of FIG. 14, the spot groups SG formed on the photosensitive drum surface (image plane) are shown. Chain double-dashed lines in this column are the projections of the lenses LS for forming the respective spot groups on the photosensitive drum surface.

A pitch (intra-row lens pitch) between adjacent lenses LS in the lens row SGR can be expressed as (m·Wsgm). Since this intra-row lens pitch needs to be larger than the width Wlpm of the beam passage areas LP in the respective lenses in the main scanning direction MD for the arrangement of the lenses LS, the following formula needs to be satisfied.

$$L \leq m \cdot Wsgm \quad \text{(Formula 5)}$$

Further, in order to suppress a variation in the formation positions of the spots SP (incident positions of the beam spots SP) resulting from a variation in the distance between the image plane (surface to be irradiated) and the line head 29, the following formula holds in the case of constructing the optical system to have a substantially telecentric image side.

$$Wlpm/2 \geq Wsgm/2 + S \cdot \tan(\theta)$$

When the both sides of this formula are doubled, the following formula is obtained.

$$Wlpm \geq Wsgm + 2 \cdot S \cdot \tan(\theta) \quad \text{(Formula 6)}$$

When the formulas 5 and 6 are plotted, taking Wsgm in the horizontal axis and Wlpm in the vertical axis, a graph shown in FIG. 15 is obtained and a hatched range of FIG. 15 satisfies the both formulas. When an intersection of the two lines in FIG. 15 is calculated and a range of Wlpm corresponding to the hatched part is calculated, the following formula is derived.

$$Wlpm \geq 2 \cdot S \cdot \tan(\theta) \cdot m/(m-1) \quad \text{(Formula 2)}$$

E. Construction of the Lens Array in this Embodiment

Based on the above investigation, the lens diameter needs to be about 0.5 [mm] or larger in order to provide one lens LS for each light emitting element group 295 and form the lens array 299 in which the lenses LS are two-dimensionally arranged. In other words, in the lens array 299, the lenses LS having a relatively large diameter of 0.5 [mm] for microlenses are two-dimensionally arranged and convex shapes and concave shapes are densely arranged. The lens array 299 in which the convex shapes and concave shapes are densely arranged in this way tends to have a reduced mold releasability upon being formed. As a result, there has been a possibility that such a problem as to damage the lens surfaces of the lenses LS during the mold releasing occurs to impair the surface accuracy of the lenses LS.

Accordingly, in this embodiment, the curvature of an outer peripheral portion OC of the lens LS has a sign opposite to that of the curvature of the lens LS on the optical axis OA (that is, curvature of the lens center CT) or has an absolute value smaller than the curvature of the lens LS on the optical axis OA (that is, curvature of the lens center CT) in the cross section of the lens LS including the optical axis OA of the imaging optical system. Thus, an angle of tangent at the lens outer peripheral portion OC is suppressed to a small value and each lens LS is so shaped as to be easily released from the mold. As a result, the mold releasability of the lens array can be improved. This is also described in detail. Unless particularly specified, the "lens cross section" or the "cross section of the lens" is assumed as the cross section of the lens LS including the optical axis OA.

Figure 16:
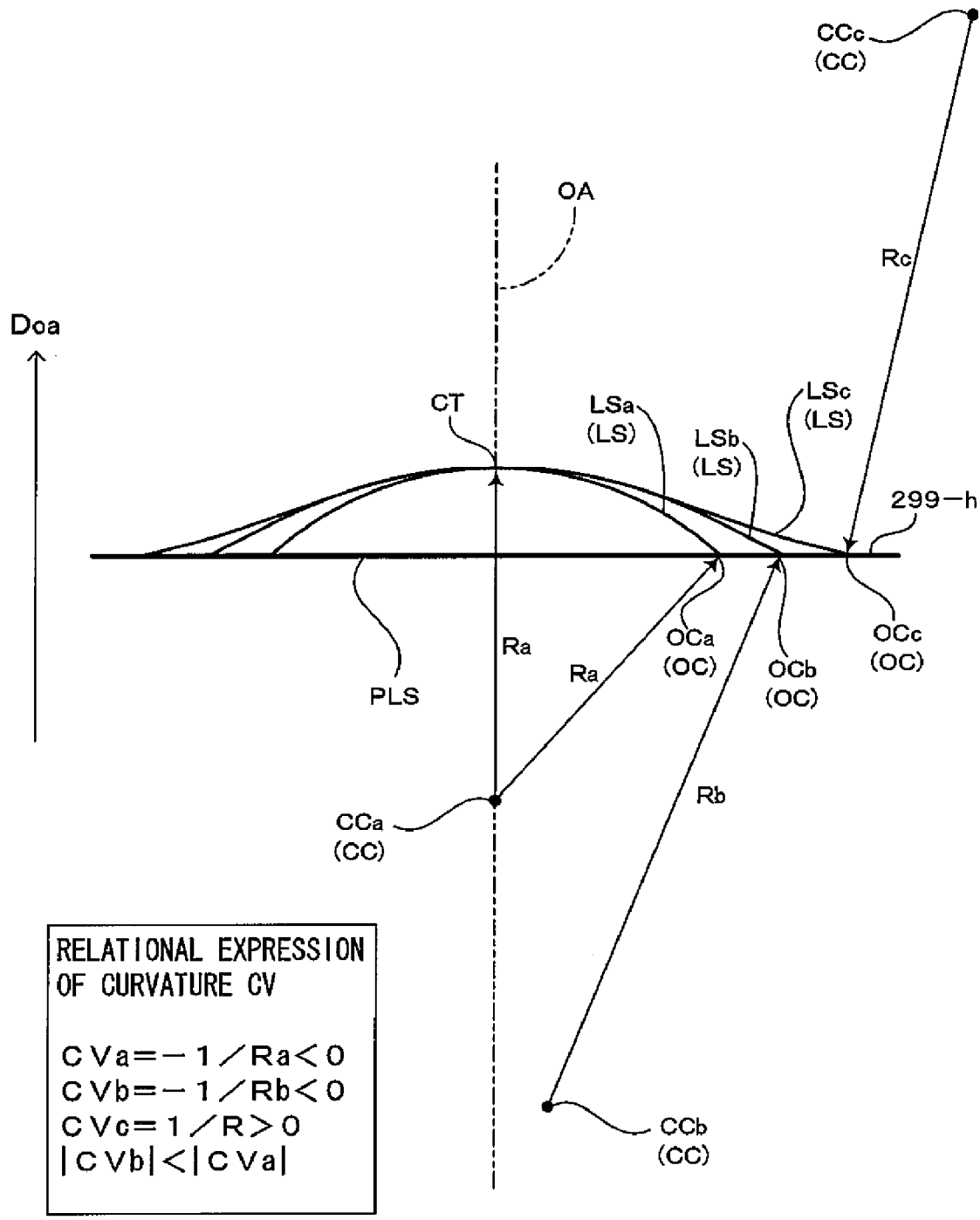
FIG. 16 is a diagram showing the cross sections of the lenses including the optical axes.

FIG. 16 is a diagram showing the cross sections of the lenses including the optical axes OA. A lens LSb or LSc shown in FIG. 16 corresponds to a lens according to the invention. A lens LSa is shown for the comparison with the lens according to the invention. The lenses LSa, LSb and LSc are all formed on the lens array top surface 299-*h*. In FIG. 16, the lenses LSa, LSb and LSc are shown in an overlapping manner so that the lens centers thereof coincide, and have sags of the same size. Further, the respective lenses LSa, LSb and LSc have an equal radius of curvature Ra at the lens centers CT.

In FIG. 16, a curvature center CC of the lens LSa is expressed as a curvature center CCa, a curvature center CC of the outer peripheral portion of the lens LSb is expressed as a curvature center CCb, and a curvature center CC of the outer peripheral portion of the lens LSc is expressed as a curvature center CCc. A curvature CV in this specification can be defined as follows (see a rectangular enclosure in FIG. 16). In other words, the absolute values of curvatures CV (CVa, CVb, CVc) are inverses of the radii of curvatures R (Ra, Rb, Rc). When the curvature center CC is located in a space before (downstream in the direction Doa) the lens surface of the lens LS in the light beam propagation direction Doa, the curvature CV given by the curvature center CC is positive. On the other hand, when the curvature center CC is located in a space behind (upstream in the direction Doa) the lens surface of the lens LS in the light beam propagation direction Doa, the curvature CV given by the curvature center CC is negative.

In FIG. 16, the outer peripheral portion OC of the lens LSa is identified by OCa, that of the lens LSb is identified by OCb and that of the lens LSc is identified by the OCc. In this specification, the outer peripheral portion OC of the lens LS is defined as follows. In other words, the boundary between the lens LS and the flat surface PLS including the flat portion PL is the lens outer peripheral portion. The lens outer peripheral portion is described later using an angle of tangent. Accordingly, this angle of tangent is first defined.

FIG. 17 is a diagram defining the angle of tangent at the lens outer peripheral portion and showing a cross section including the optical axis OA. First of all, it is assumed that TL denotes a tangent to the lens surface LSF at the lens outer peripheral portion OC. Next, out of angles formed by the intersection of the tangent TL and the flat surface PLS, angles formed at a lens side are angles $\beta 1$, $\beta 2$. Out of these angles $\beta 1$, $\beta 2$, the angle $\beta 1$ formed at a lens center side is the angle of tangent. At this time, the angle $\beta 1$ can lie in a range defined by the following formula.

$$0 < \beta 1 < 90 \text{ (degrees)}$$

Further, it is assumed that an inclination of the tangent is given by $\tan(\beta 1)$.

As shown in FIG. 16, both the curvature at the lens center CT and the one at the lens outer peripheral portion OCa are $CVa = -1/Ra$ in the lens LSa. In contrast, the curvature $CVb = -1/Rb$ of the lens outer peripheral portion OCb has a smaller absolute value than the curvature $CVa = -1/Ra$ at the lens center CT in the lens LSb. In the lens LSc, the curvature $CVc = 1/Rc$ of the lens outer peripheral portion OCc has a sign opposite to that of the curvature $CVa = -1/Ra$ at the lens center. Since the lenses LSb, LSc are formed in this way, the angles of tangent at the lens outer peripheral portions OCb, OCc can be made smaller than the angle of tangent of the lens outer peripheral portion OCa of the lens LSa. In other words, the respective lenses LSb, LSc are so shaped as to be easily released from the mold, with the result that the lens array in which such lenses LSb, LSc are arranged has good mold releasability.

Figure 18:
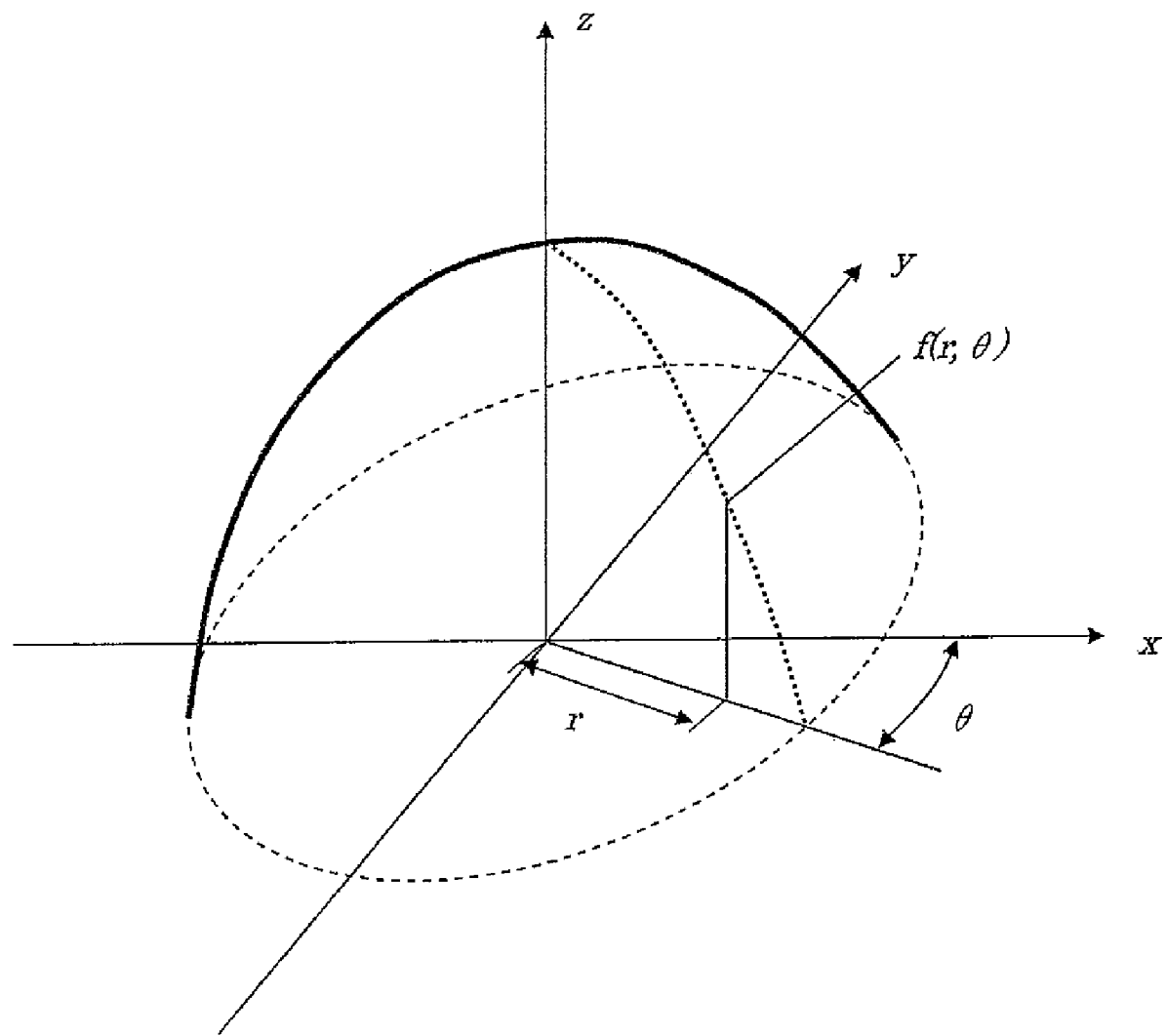
FIG. 18 is a diagram defining the lens surface in an r-θ coordinate system.

Here, the lens surfaces of the lenses LSb, LSc having the curvatures as described above are considered. Upon specifying the lens surfaces, it is effective to use a polar coordinate system, for example, as shown in FIG. 18. In other words, a lens height z in an optical axis direction in an r-θ coordinate system is defined by the following formula in which r is a a distance from the optical axis OA and θ is a rotation angle about the optical axis OA.

$$z = f(r, \theta)$$

In this case, a curvature (r, θ) at coordinates (r, θ) on the lens surface is expressed by the following formula.

$$c(r, \theta) = \frac{\frac{d^2 f(r, \theta)}{dr^2}}{\left(1 + \left(\frac{df(r, \theta)}{dr}\right)^2\right)^{\frac{3}{2}}} \quad \text{(Formula 7)}$$

Since r=0 on the optical axis, a curvature on the optical axis OA at a certain angle θ1 is expressed by the following formula.

$$c(0, \theta_1) = \frac{\frac{d^2 f(0, \theta_1)}{dr^2}}{\left(1 + \left(\frac{df(0, \theta_1)}{dr}\right)^2\right)^{\frac{3}{2}}} \quad \text{(Formula 8)}$$

The curvature of the peripheral portion in the cross section is expressed by a formula 9 when r≠0.

$$c(r, \theta_1) = \frac{\frac{d^2 f(r, \theta_1)}{dr^2}}{\left(1 + \left(\frac{df(r, \theta_1)}{dr}\right)^2\right)^{\frac{3}{2}}} \quad \text{(Formula 9)}$$

Accordingly, a condition that the curvature of the outer peripheral portion of the lens surface has a sign opposite to that of the curvature on the optical axis in the cross section passing the certain optical axis OA is expressed by a formula 10 when r≠0.

$$\frac{\frac{d^2 f(0, \theta)}{dr^2}}{\left(1 + \left(\frac{df(0, \theta)}{dr}\right)^2\right)^{\frac{3}{2}}} \cdot \frac{\frac{d^2 f(r, \theta)}{dr^2}}{\left(1 + \left(\frac{df(r, \theta)}{dr}\right)^2\right)^{\frac{3}{2}}} < 0 \quad \text{(Formula 10)}$$

A condition that the curvature of the outer peripheral portion has a smaller absolute value than that on the optical axis OA is expressed by a formula 11.

$$\left| \frac{\frac{d^2 f(0, \theta)}{dr^2}}{\left(1 + \left(\frac{df(0, \theta)}{dr}\right)^2\right)^{\frac{3}{2}}} \right| > \left| \frac{\frac{d^2 f(r, \theta)}{dr^2}}{\left(1 + \left(\frac{df(r, \theta)}{dr}\right)^2\right)^{\frac{3}{2}}} \right| \quad \text{(Formula 11)}$$

In the above embodiment, organic EL devices are used as the light emitting elements 2951 and these organic EL devices have smaller light quantities as compared with LEDs (light emitting diodes) and the like, wherefore the light quantities introduced to the lenses LS tend to decrease. Particularly, in the case of using bottom emission-type organic EL devices, light beams emitted from the organic EL devices are partly absorbed by the head substrate 293. Thus, the light quantities introduced to the lenses LS are farther decreased. In such a case, it is thought to increase the lens diameter to introduce sufficient lights to the lenses LS. However, conventionally, there has been a possibility of deteriorating the mold releasability by increasing the lens diameter. On the other hand, since the respective lenses LSb, LSc are so shaped as to be easily released from the mold in the above embodiment, the lens diameter can be easily increased without deteriorating the mold releasability. Therefore, a good exposure can be performed by introducing sufficient light beams to the lenses LS.

A plurality of lens cross sections such as a cross section in the longitudinal direction LGD, a cross section in the width direction LTD, a cross section in a direction at a specified angle to the longitudinal direction LGD and the width direction LTD can be thought as the lens cross section including the optical axis OA. When the above lens shape condition is satisfied in the cross sectional shape in any one direction in such a lens cross section including the optical axis OA, the effect of improving the mold releasability is exhibited. In other words, if the lens shape condition is not satisfied in the lens cross sections in all the directions, but satisfied in the lens cross section of any one direction, the effect of improving the mold releasability is exhibited. Here, the above condition "the curvature of the outer peripheral portion OC of the lens LS has a sign opposite to that of the curvature of the lens LS on the optical axis OA or has a smaller absolute value than the curvature of the lens LS on the optical axis OA" is referred to as the "lens shape condition".

One of the influences of the lens array on the mold releasability is the shapes of the lenses adjacent to each other and, in consideration of this, it is desirable to satisfy the lens shape condition in a cross section including an arrangement direction of the lens LS and the optical axes OA. The lens array 299 constructed as described above is formed using a mold as described, for example, in JP-A-2005-276849 and JP-A-2008-152039. Specifically, the mold is formed with a plurality of recesses for forming the lenses LS. A light curing resin is supplied into the respective recesses. By irradiating ultraviolet rays to the light curing resin present in the recesses to solidify the light curing resin with the mold and the lens substrate (light transmissive substrate) 2991 held in contact, the lenses LS are formed on the top surface of the lens substrate 2991. When the light curing resin is solidified, the mold is released from the lenses LS and the lens substrate 2991. At this time, the lenses LS adjacent to each other influence each other. For example, focusing on the lens LS-1 of FIG. 9, the lens LS-2 is arranged adjacent to this lens LS-1 in the longitudinal direction LGD. As shown in FIG. 19A, the lens LS-1 is proximate to the lens LS-2 in the longitudinal direction LGD and these proximate parts influence each other during the mold releasing. Thus, the lens LS-1 is preferably formed such that the curvature of the outer peripheral portion of the lens LS-1 has a sign opposite to that of the curvature of the lens LS-1 on the optical axis or a smaller absolute value than the curvature of the lens LS-1 on the optical axis OA-1 in a cross section in the longitudinal direction LGD of the imaging optical system formed by this lens LS-1 including the optical axis OA-1. In this cross section, for the lens LS-2, the curvature of the outer peripheral portion of the lens LS-2 has preferably a sign opposite to that of the curvature of the lens LS-2 on the optical axis OA-2 or a smaller absolute value than the curvature of the lens LS-2 on the optical axis OA-2.

Further, since the lens row LSR including the lens LS-1 and the lens row LSR including the lens LS-3 are arranged in the width direction LTD as shown in FIG. 9, the lenses LS-1, LS-3 are preferably formed as follows. Specifically, the curvature of the outer peripheral portion of the lens LS-1 has preferably a sign opposite to that of the curvature of the lens LS-1 on the optical axis or a smaller absolute value than the curvature of the lens LS-1 on the optical axis OA-1 in a cross section (corresponding to a "second cross section" of the invention) in the width direction LTD including the optical axis OA-1. Further, the curvature of the outer peripheral portion of the lens LS-3 has preferably a sign opposite to that of the curvature of the lens LS-3 on the optical axis OA-3 or a smaller absolute value than the curvature of the lens LS-3 on the optical axis OA-3 in a cross section (corresponding to a "third cross section" of the invention) parallel to the second cross section and including the optical axis OA-3.

In this way, the lens shape condition is satisfied in one cross section or two cross sections in conformity with the lens arrangement. It is also possible, as a matter of course, to form the lenses LS to satisfy the lens shape condition in the lens cross sections in all the directions. Since not only the effect of improving the mold releasability, but also the effect of improving aberrations is expected in the imaging optical systems including such lenses LS, a finer latent image can be written by the line head 29.

F. Miscellaneous

As described above, in the above embodiment, the longitudinal direction LGD and the main scanning direction MD correspond to a "first direction" of the invention, the width direction LTD and the sub scanning direction SD to a "second direction" of the invention and the photosensitive drum 21 to a "latent image carrier" of the invention.

The invention is not limited to the above embodiments and various changes other than the above can be made without departing from the gist thereof. For example, in the above embodiment, the optical system is constructed using the lens arrays 299 having the lenses LS formed on the top surfaces 299-$h$. However, the construction of the optical system is not limited to this.

Figure 20:
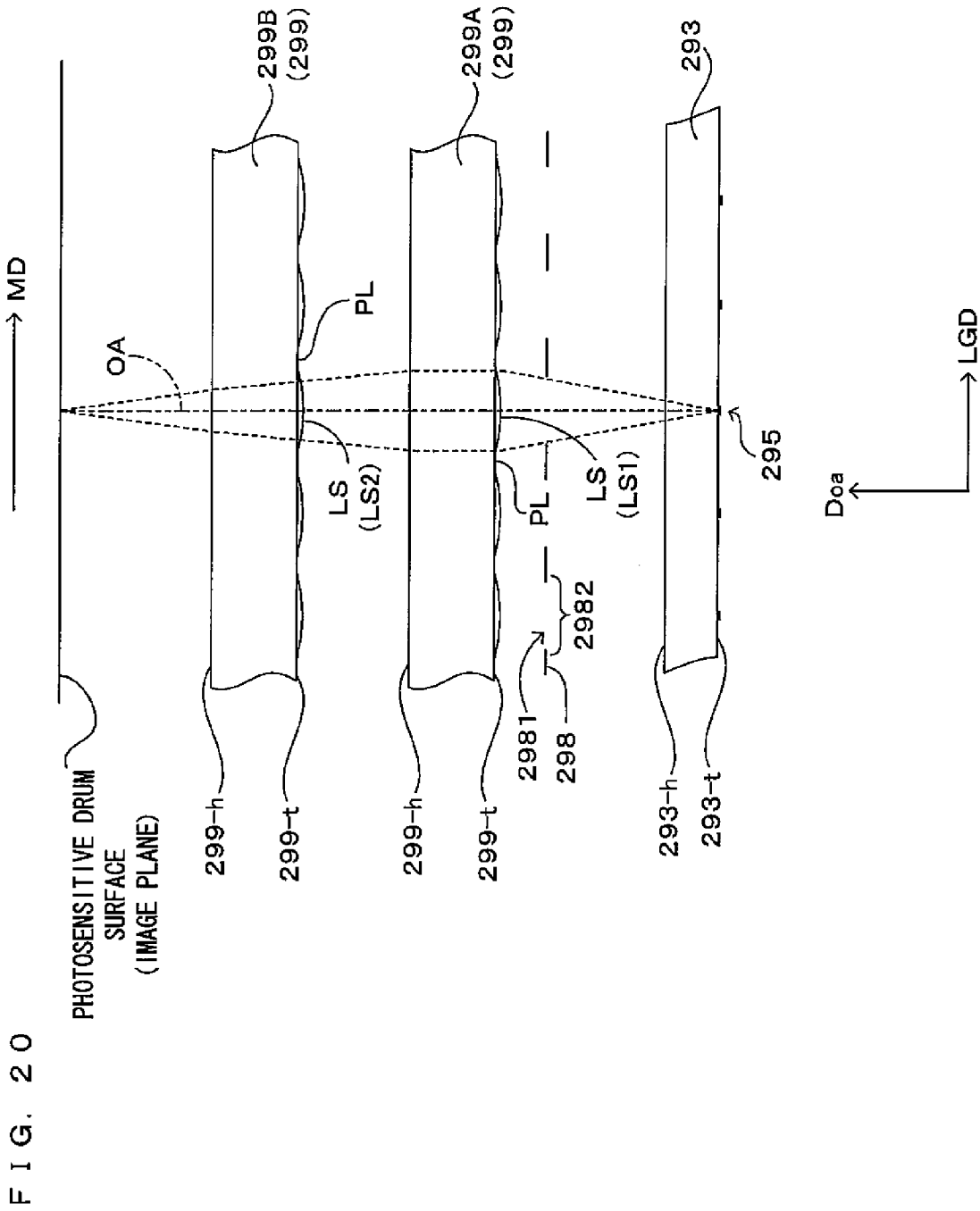
FIG. 20 is a longitudinal sectional view of an optical system according to another embodiment showing a longitudinal cross section including an optical axis of lenses formed on lens arrays.

FIG. 20 is a longitudinal sectional view of an optical system according to another embodiment showing a longitudinal cross section including an optical axis of lenses LS formed on lens arrays. In the following description, characteristic parts of the optical system according to the other embodiment are described and parts common to the optical system already described above are identified by equivalent reference numerals and not described. As shown in FIG. 20, the lenses LS are formed on under surfaces 299-$t$ of the lens arrays 299. Accordingly, portions with a finite curvature where the lenses LS are formed and flat portions PL with an infinite curvature by having no lenses LS formed are present on the under surface 299-$h$.

In the optical system shown in FIG. 20, two lens arrays 299 (299A, 299B) having such a construction are arranged side by side in the light beam propagation direction Doa and two lenses LS1, LS2 arranged in the light propagation direction Doa are arranged for each light emitting element group 295. Further, the optical axis OA (chain double-dashed line in FIG. 20) passing the lens centers of the first and the second lenses LS1, LS2 corresponding to the same light emitting element group 295 is orthogonal to or substantially orthogonal to the under surface 293-$t$ of the head substrate 293. An aperture plate 298 is provided between the head substrate 293 and the lens array 299A in the light beam propagation direction Doa and is perforated with aperture openings 2981 for the respective light emitting element groups 295.

In this way, the optical system according to the other embodiment includes apertures 2982 and the first and the second lenses LS1, LS2. Accordingly, light beams emitted from the light emitting element groups 295 are imaged by the first and the second lenses LS1, LS2 after being narrowed down by the apertures 2982 (aperture plate 298).

In the optical system according to this other embodiment as well, the lens LS is formed such that the curvature of the outer peripheral portion OC of the lens LS has a sign opposite to that of the curvature of the lens LS on the optical axis OA (that is, curvature at the lens center CT) or a smaller absolute value than the curvature of the lens LS on the optical axis OA (that is, curvature at the lens center CT) in a cross section of the lens LS including the optical axis OA of the imaging optical system. Accordingly, angles of tangent at the lens outer peripheral portions OC are reduced and the respective lenses LS are so shaped as to be easily released from the mold. This is described in detail.

Figure 21:
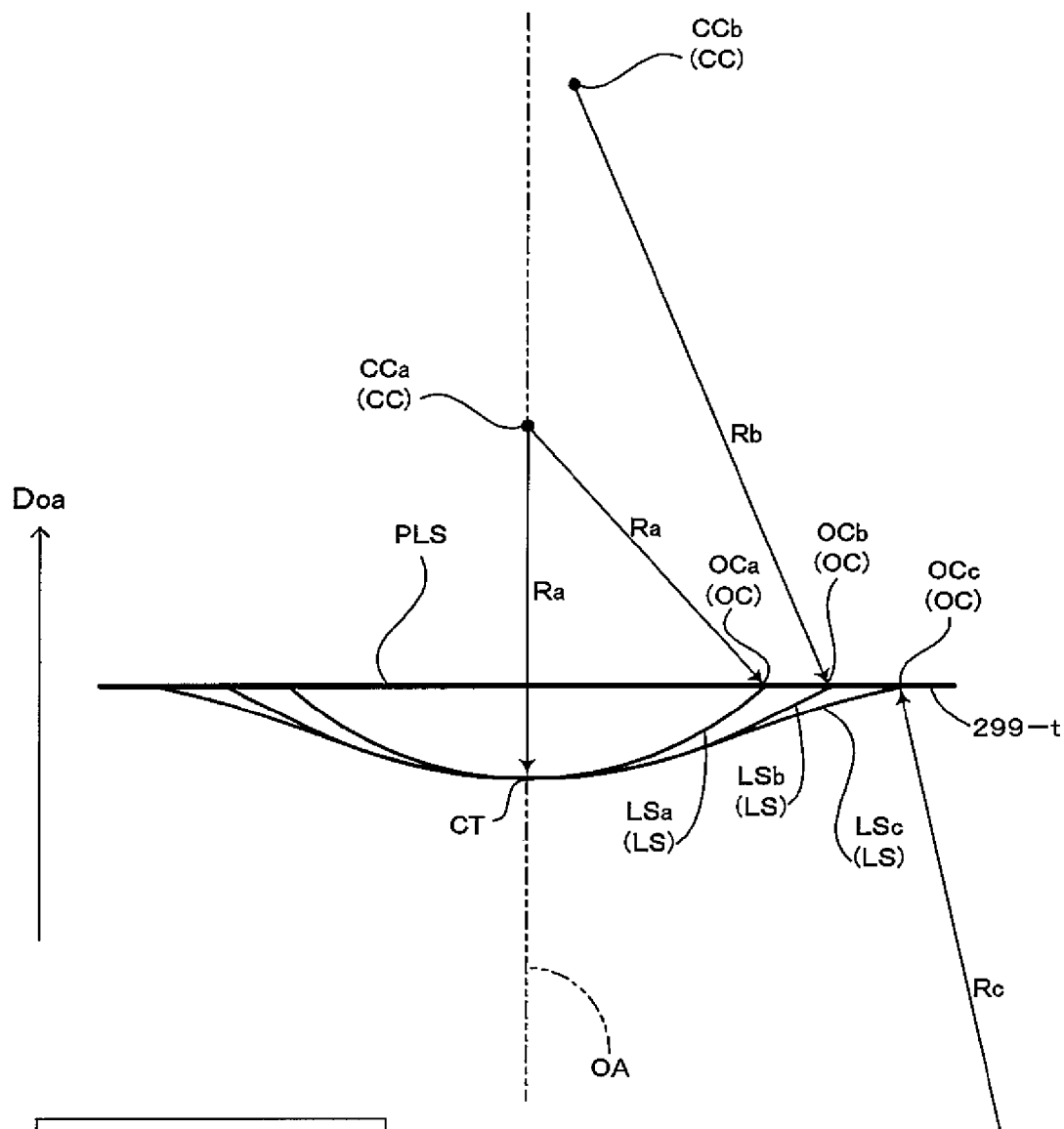
FIG. 21 is a diagram showing a cross section including optical axes of lenses.

FIG. 21 is a diagram showing a cross section including optical axes OA of lenses. FIG. 21 differs from FIG. 16 only in that the lenses LS are formed on the under surface 299-$t$ of the lens array 299, but is similar to FIG. 16 in other parts. Accordingly, points of difference from FIG. 16 are mainly described below and common parts are not described.

Similar to the case of FIG. 16, a lens LSb or LSc shown in FIG. 21 corresponds to a lens according to the invention, and a lens LSa is shown for the comparison with the lens according to the invention. In the lens LSa, both the curvature at the lens center CT and the one at the lens outer peripheral portion OCa are CVa=1/Ra. In contrast, the curvature CVb=1/Rb of the lens outer peripheral portion OCb has a smaller absolute value than the curvature CVa=1/Ra at the lens center CT in the lens LSb. In the lens LSc, the curvature CVc=−1/Rc of the lens outer peripheral portion OCc has a sign opposite to that of the curvature CVa=1/Ra at the lens center. Since the lenses LSb, LSc are formed in this way, angles of tangent at the lens outer peripheral portions OCb, OCc can be made smaller than an angle of tangent at the lens outer peripheral portion OCa of the lens LSa. In other words, the respective lenses LSb, LSc are so shaped as to be easily released from the mold, with the result that the lens array in which such lenses LSb, LSc are arranged has good mold releasability.

Although the lenses LS are provided on either one of the top surface 299-$h$ or the under surface 299-$t$ of the lens array 299 in the above embodiments, the lenses LS may be formed on the both surfaces of the lens array 299.

Further, although the two lens arrays 299 are used in the above embodiments, the number of the lens arrays 299 is not limited to this.

In the above embodiments, the lens array 299 is formed by forming the lenses LS made of the light curing resin on the light transmissive substrate as the lens substrate 2991. However, the method for forming the lens array 299 is not limited to this, and the lens array 299 may be formed by the following method disclosed in JP-A-2005-276849 and the like. By this forming method, with a substrate (resin substrate) made of a thermoplastic resin kept at a temperature equal to or higher than a transition temperature, a mold is pressed into close contact with the resin substrate. The mold is released from the resin substrate at a timing when the resin substrate and the mold are cooled to or below the transition temperature of the resin substrate. In other words, also by such a forming method, good mold releasability of the lens array can be realized by forming each lens LS such that the curvature at the lens outer peripheral portion OC has a sign opposite to that of the curvature at the lens center CT or has a smaller absolute value than the curvature at the lens center CT.

In the above embodiments, three light emitting element group rows 295R are arranged in the width direction LTD. However, the number of the light emitting element group rows 295R is not limited to three and is sufficient to be one or more.

In the above embodiments, each light emitting element group 295 is made up of two light emitting element rows 2951R. However, the number of the light emitting element rows 2951R constituting the light emitting element group 295 is not limited to two and may be, for example, one.

Further, in the above embodiments, the light emitting element row 2951R is made up of four light emitting elements 2951. However, the number of the light emitting elements 2951 constituting the light emitting element row 2951R is not limited to four.

In the above embodiments, organic EL devices are used as the light emitting elements 2951. However, the devices other than the organic EL devices may be used as the light emitting elements 2951. For example, LEDs (light emitting diodes) may be used as the light emitting elements 2951.

Next, examples of the invention are described, but the invention is not restricted by the following examples and can be, of course, embodied by being appropriately changed within the scope conformable to the gist described above and below. Any of these examples are embraced by the technical scope of the invention.

EXAMPLE 1

Figure 23:
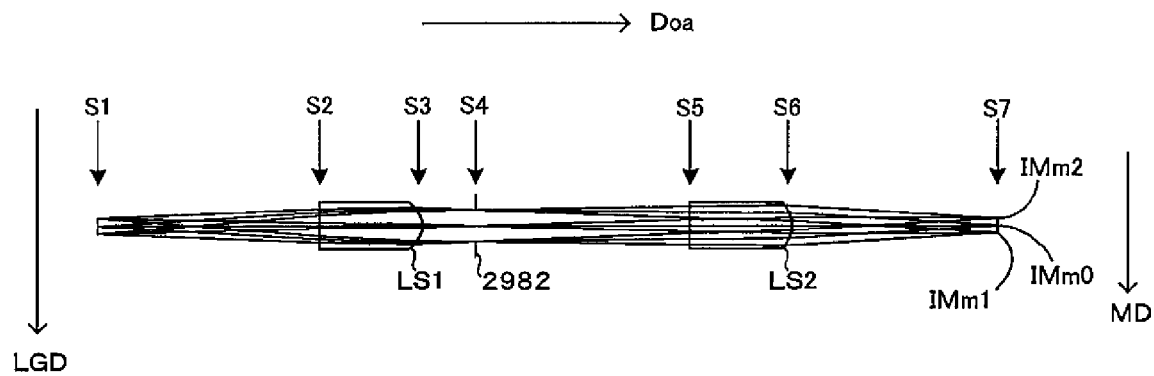
FIG. 23 is a sectional view of the optical system according to Example 1 in a main scanning direction.
Figure 24:
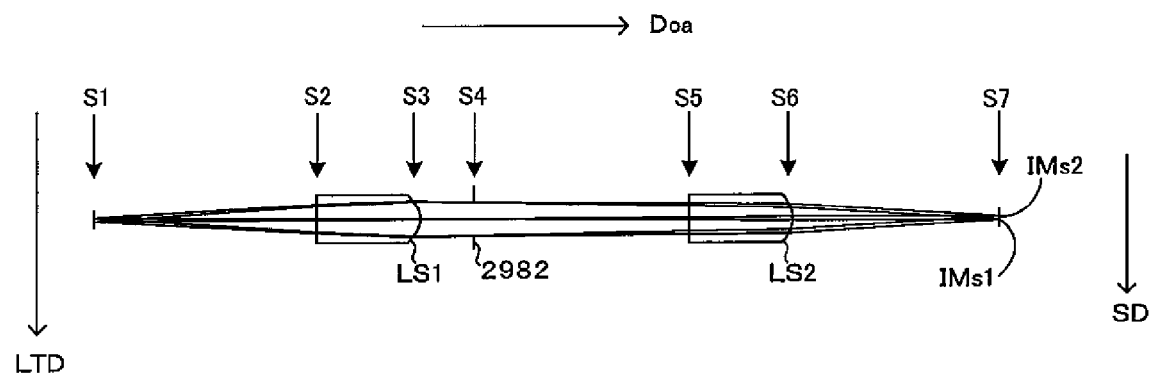
FIG. 24 is a sectional view of the Example 1 in a sub scanning direction.

FIG. 22 is a table showing data on an optical system according to Example 1, FIG. 23 is a sectional view of the optical system according to Example 1 in a main scanning direction, FIG. 24 is a sectional view of the Example 1 in a sub scanning direction, and FIG. 25 is a table showing conditions used upon calculating optical paths shown in FIGS. 23 and 24 by a simulation. As shown in FIG. 25, a main-scanning spot group width Wsgm is 0.180 [mm] in Example 1. In conformity with this, an optical path connecting images IMm0, IMm1 and IMm2 is shown in FIG. 23. In other words, the image IMm0 is an image formed on an optical axis (that is, image height in the main scanning direction MD is 0 [mm]), the image IMm1 is an image formed with an image height of 0.09 [mm] (=Wsgm/2) in the main scanning direction MD and the image IMm2 is an image formed with an image height of −0.09 [mm] (=−Wsgm/2) in the main scanning direction MD. As shown in FIG. 25, a sub-scanning spot group width Wsgs is 0.042 [mm] in Example 1. In conformity with this, an optical path connecting images IMs1, IMs2 is shown in FIG. 24. In other words, the image IMs1 is an image formed with an image height of 0.021 [mm] (=Wsgs/2) in the sub scanning direction SD and the image IMs2 is an image formed with an image height of −0.021 [mm] (=−Wsgs/2) in the sub scanning direction SD.

FIG. 26 is a chart showing spot diagrams in Example 1. In FIG. 26, the positions of spots are indicated by a main-scanning image height IHm in the main scanning direction MD and a sub-scanning image height IHs in the sub scanning direction SD. In other words, the uppermost spot diagram in FIG. 26 is the spot diagram of a spot formed at a main-scanning image height IHm=0.090 [mm] and a sub-scanning image height IHs=−0.21 [mm]. Incident angles IRm, IRs in FIG. 26 indicate incident angles of a principal ray IRL of light beams forming the spot on an entrance pupil. Here, the incident angles are described with reference to FIG. 27. FIG. 27 is a diagram showing the incident angles. In other words, when a beam projecting the principal ray IRL on a plane including the light beam propagation direction Doa and the main scanning direction MD is called a main-scanning projection beam IRLm, an incident angle of this main-scanning projection beam IRLm with respect to the main scanning direction MD is the main-scanning incident angle IRm. Further, when a beam projecting the principal ray IRL on a plane including the light beam propagation direction Doa and the sub scanning direction SD is called a sub-scanning projection beam IRLs, an incident angle of this sub-scanning projection beam IRLs with respect to the sub scanning direction SD is the sub-scanning incident angle IRs.

FIG. 28 is a table showing the lens data of a first lens in Example 1. As shown in FIG. 28, the lens diameter of the first lens LS1 is 0.54 [mm] (=main-scanning passage area width Wlpm+0.105 [mm]). What should be noted here is that, in the first lens LS1, a curvature at the lens center is 1.67, whereas a curvature at the lens outer peripheral portion is 0.94. In other words, the curvature at the lens outer peripheral portion has a smaller absolute value than the one at the lens center. As a result, an inclination of a tangent (0.462) at the lens outer peripheral portion is suppressed to a small value. Thus, the mold releasability of the lens array is improved by forming the lens array by arranging the first lenses LS1.

FIG. 29 is a table showing the lens data of a second lens in Example 1. As shown in FIG. 29, the lens diameter of the second lens LS2 is 0.54 [mm] (=main-scanning passage area width Wlpm+0.071 [mm]). What should be noted here is that, in the second lens LS2, a curvature at the lens center is 1.41, whereas a curvature at the lens outer peripheral portion is 0.58. In other words, the curvature at the lens outer peripheral portion has a smaller absolute value than the one at the lens center. As a result, an inclination of a tangent (0.370) at the lens outer peripheral portion is suppressed to a small value. Thus, the mold releasability of the lens array is improved by forming the lens array by arranging the second lenses LS2.

As can be understood from the data on the optical system of FIG. 22, the first and the second lenses LS1, LS2 in Example 1 are rotationally symmetric lenses with the optical axes OA of these lenses as rotationally symmetric axes. Thus, in Example 1, the lens construction can be simplified.

EXAMPLE 2

Figure 31:
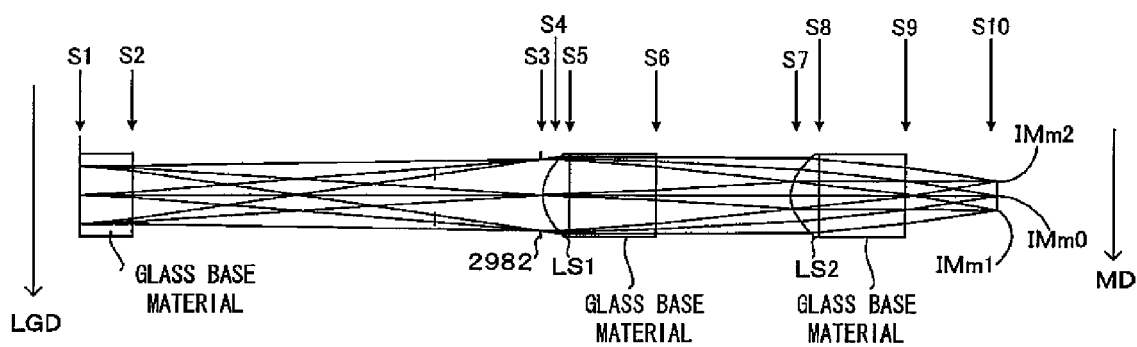
FIG. 31 is a sectional view of the optical system according to Example 2 in the main scanning direction.
Figure 32:
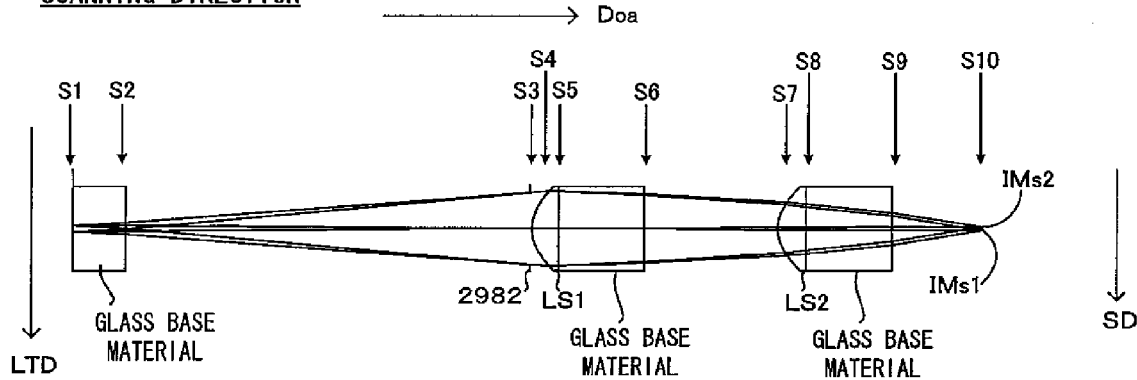
FIG. 32 is a sectional view of Example 2 in the sub scanning direction.

FIG. 30 is a table showing data on an optical system according to Example 2. As shown in FIG. 30, a main scanning direction coordinate x is a coordinate axis in the main scanning direction MD and a sub scanning direction coordinate y is a coordinate axis in the sub scanning direction SD. An origin of an x-y coordinate system passes an optical axis OA. FIG. 31 is a sectional view of the optical system according to Example 2 in the main scanning direction, and FIG. 32 is a sectional view of Example 2 in the sub scanning direction. As shown in FIGS. 31 and 32, an object plane S1 corresponds to the under surface of a glass base material, and Example 2 corresponds to a case where bottom emission-type organic EL devices were used as light emitting elements 2951. First and second lenses LS1, LS2 are both formed on the under surface of the glass base material.

FIG. 33 is a table showing conditions used upon calculating optical paths shown in FIGS. 31 and 32 by a simulation. As shown in FIG. 33, a main-scanning spot group width Wsgm is 0.65 [mm] in Example 2. In conformity with this, an optical path connecting images IMm0, IMm1 and IMm2 is shown in FIG. 31. In other words, the image IMm0 is an image formed on an optical axis (that is, image height in the main scanning direction MD is 0 [mm]), the image IMm1 is an image formed with an image height of 0.325 [mm] (=Wsgm/2) in the main scanning direction MD and the image IMm2 is an image formed with an image height of −0.325 [mm] (=−Wsgm/2) in the main scanning direction MD. As shown in FIG. 33, a sub-scanning spot group width Wsgs is 0.0635 [mm] in Example 2. In conformity with this, an optical path connecting images IMs1, IMs2 is shown in FIG. 32. In other words, the image IMs1 is an image formed with an image height of 0.03175 [mm] (=Wsgs/2) in the sub scanning direction SD and the image IMs2 is an image formed with an image height of −0.03175 [mm] (=−Wsgs/2) in the sub scanning direction SD.

FIG. 36 is a table showing the lens data of a first lens in Example 2. As shown in FIG. 36, the lens diameter of the first lens LS1 is 1.60 [mm] (=main-scanning passage area width Wlpm+0.187 [mm]). What should be noted here is that, in the first lens LS1, a curvature at the lens center is 0.686, whereas a curvature at the lens outer peripheral portion is 0.003. In other words, the curvature at the lens outer peripheral portion has a smaller absolute value than the one at the lens center. As a result, an inclination of a tangent (0.512) at the lens outer peripheral portion is suppressed to a small value. Thus, the mold releasability of the lens array is improved by forming the lens array by arranging the first lenses LS1.

FIG. 34 is a table showing the lens data of a second lens in Example 2. As shown in FIG. 34, the lens diameter of the second lens LS2 is 1.60 [mm] (=main-scanning passage area width Wlpm+0.77 [mm]). What should be noted here is that, in the second lens LS2, a curvature at the lens center is 0.889, whereas a curvature at the lens outer peripheral portion is 0.354. The curvature at the lens outer peripheral portion has a smaller absolute value than the one at the lens center. As a result, an inclination of a tangent (0.668) at the lens outer peripheral portion is suppressed to a small value. Thus, the mold releasability of the lens array is improved by forming the lens array by arranging the second lenses LS2.

Further, the following effects are exhibited in Example 2. Specifically, as shown in FIGS. 30 to 32, the lens surface of the second lens LS is an x-y polynomial surface and has different cross-sectional shapes in the main scanning direction MD and in the sub scanning direction SD. In the case of changing the curvature for an improvement in the mold releasability, it is not preferable to drastically change the inclination of the tangent since it may lead to other problems such as deterioration in mold processing efficiency. However, as shown in FIG. 14 and other figures, the beam passage areas LP have an elliptical shape long in the main scanning direction MD due to the configuration of the light emitting element groups 295 including the light emitting element rows 2951R. Accordingly, a distance in the sub scanning direction SD from the boundaries of the beam passage areas LP to the lens outer peripheral portion is relatively long. Thus, even a moderate change in the inclination of the tangent in a cross section in the sub scanning direction can suppress the inclination of the lens tangent at the lens outer peripheral portion to a small value by making the lens shape different in the cross sections in the main scanning direction and in the sub scanning direction. FIG. 35 is a table showing the lens data of the second lens in the sub scanning direction in Example 2. As shown in FIG. 35, the lens diameter of the second lens LS2 is 1.70 [mm] (=sub-scanning passage area width Wlps+0.693 [mm]). What should be noted here is that, in the cross section of the second lens LS2 in the sub scanning direction, a curvature at the lens center is 0.877, whereas a curvature at the lens outer peripheral portion is −0.886. In other words, the curvature at the lens outer peripheral portion has a sign opposite to that of the curvature at the lens center. As a result an inclination of a tangent (0.440) at the lens outer peripheral portion is suppressed to a small value. In other words, in Example 2, the cross-sectional shape of the second lens LS2 in the main scanning direction MD and that of the second lens LS2 in the sub scanning direction SD differ to make the construction of the lens suitable according to the configuration of the light emitting element group 295.

In order to express a lens surface S7 of the second lens LS in an r-θ coordinate system, an x-y coordinate system shown in FIG. 32 needs to be transformed into the r-θ coordinate system, and x, y are expressed as follows when θ=0 in a positive direction of an x-axis.

$$X = r \cos \theta$$

$$Y = r \sin \theta$$

Thus, an x-y polynomial expression representing the lens surface S7 of the second lens LS is expressed as follows using the r-θ coordinate system.

$$\frac{cr^2}{1+\sqrt{1-(1+K)c^2r^2}} + Ar^2\cos^2\theta + Br^2\sin^2\theta + Cr^4\cos^4\theta + Dr^4\cos^2\theta\sin^2\theta + Er^4\sin^4\theta + FCr^6\cos^6\theta + Gr^6\cos^4\theta\sin^2\theta + Hr^6\cos^2\theta\sin^4\theta + Ir^6\sin^6\theta$$

A curvature c (r, θ) at coordinates (r, θ1) on the lens surface S7 is expressed by the following formula using the above formula.

$$c(r, \theta_1) = \frac{\frac{d^2 f(r, \theta_1)}{dr^2}}{\left(1 + \frac{df(r, \theta_1)}{dr}\right)^{\frac{3}{2}}}$$

Figure 37:
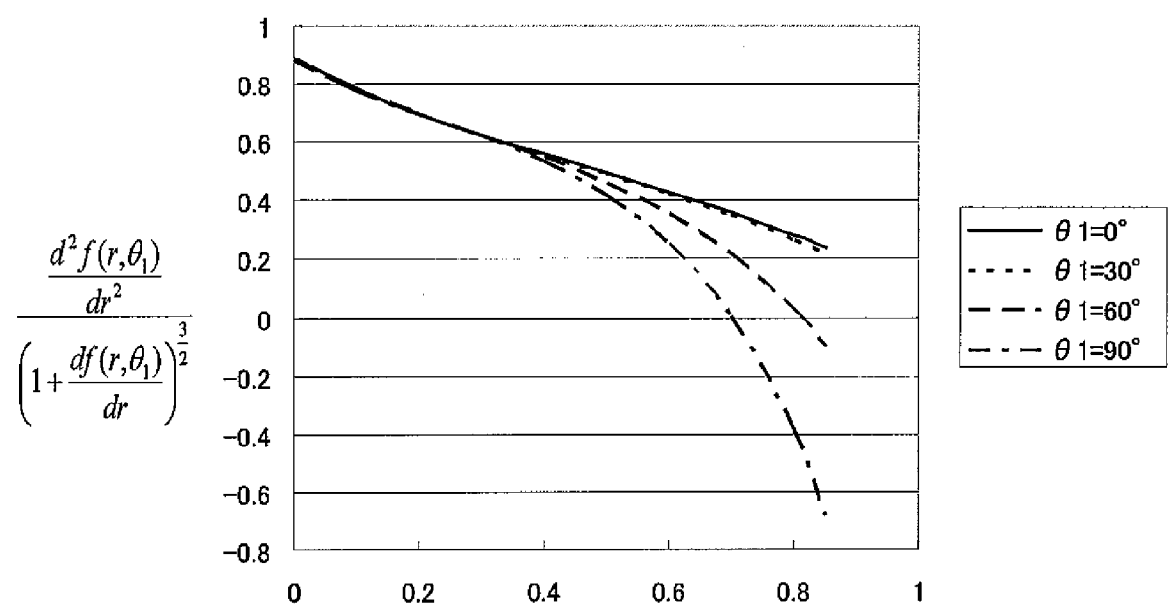
FIG. 37 is a graph showing a curvature of a second lens in Example 2.

Results shown in FIG. 37 were obtained upon calculating the curvature c (r, θ1) using this formula. As is clear from graphs shown in FIG. 37, at an arbitrary angle θ1, the curvature on the optical axis OA is understood to have a sign opposite to that of the curvature on the peripheral portion or to have a smaller absolute value than the curvature on the peripheral portion on the lens surface S7.

The bottom emission-type organic EL devices are used as the light emitting elements in Example 2, the light quantities of the organic EL devices are relatively small. Accordingly, a large image-side numerical aperture needs to be set in some cases in order to have a sufficient light quantity on the image plane (surface-to-be-irradiated). As a result, there is a possibility of increasing the lens diameter. Further, since foreign matters such as toner easily adhere to the optical system final surface, it is thought to make the optical system final surface flat as shown in Example 2. In such a case, distances from the image plane to a lens principal surface becomes longer. As a result, there is a possibility of increasing the lens diameter. Therefore, in the case of using lenses having such a large diameter, it is preferable to apply the invention to improve the mold releasability of the lens array.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. A line head, comprising:

a lens array that includes a first lens, a second lens and a light transmissive substrate on which the first lens and the second lens are arranged in a first direction; and a light emitting element substrate on which light emitting elements are arranged in the first direction, wherein the first lens is formed such that, in a cross section in the first direction including an optical axis of an imaging optical system comprised of the first lens, a curvature of the first lens at an outer peripheral portion has a sign opposite to that of a curvature of the first lens on the optical axis or has a smaller absolute value than the curvature of the first lens on the optical axis, and the first lens has a lens surface having a relation defined by either one of following formulas:

$$\frac{\frac{d^2 f(0,\theta)}{dr^2}}{\left(1+\left(\frac{df(0,\theta)}{dr}\right)^2\right)^{\frac{3}{2}}} \cdot \frac{\frac{d^2 f(r,\theta)}{dr^2}}{\left(1+\left(\frac{df(r,\theta)}{dr}\right)^2\right)^{\frac{3}{2}}} < 0$$

and $$\left|\frac{\frac{d^2 f(0,\theta)}{dr^2}}{\left(1+\left(\frac{df(0,\theta)}{dr}\right)^2\right)^{\frac{3}{2}}}\right| > \left|\frac{\frac{d^2 f(r,\theta)}{dr^2}}{\left(1+\left(\frac{df(r,\theta)}{dr}\right)^2\right)^{\frac{3}{2}}}\right|$$

where r is a distance from the optical axis and θ is a rotation angle about the optical axis.

2. The line head according to claim 1, wherein the second lens is formed such that, in the cross section, a curvature of the second lens at an outer peripheral portion has a sign opposite to that of a curvature of the second lens on the optical axis or has a smaller absolute value than the curvature of the second lens on the optical axis.

3. The line head according to claim 1, wherein the lens array includes a third lens which is arranged in a second direction orthogonal to the first direction of the first lens at a position different from the first lens, the first lens is formed such that, in a second cross section in the second direction including the optical axis of the first lens, the curvature of the first lens at the outer peripheral portion has a sign opposite to that of the curvature of the first lens on the optical axis or has a smaller absolute value than the curvature of the first lens on the optical axis, and the third lens is formed such that, in a third cross section parallel to the second cross section and including the optical axis of the third lens, a curvature of the third lens at an outer peripheral portion has a sign opposite to that of the curvature of the third lens on the optical axis or has a smaller absolute value than the curvature of the third lens on the optical axis.

4. The line head according to claim 1, wherein the second lens has a lens surface with a same shape as the first lens.

5. The line head according to claim 1, wherein the first lens is formed such that a shape of the first lens in the cross section and that in a second cross section in a second direction including the optical axis of the first lens differ.

6. The line head according to claim 1, wherein the first lens is a rotationally symmetric lens with the optical axis set as a rotationally symmetric axis.

7. The line head according to claim 1, wherein a light emitting element row which is made up of the light emitting elements arranged in the first direction is arranged on the light emitting element substrate.

8. The line head according to claim 1, wherein the light emitting elements are organic EL devices.

9. The line head according to claim 8, wherein the organic EL devices are of a bottom emission type.

* * * * *